US012620319B2

(12) United States Patent
Jayaramaiah et al.

(10) Patent No.: US 12,620,319 B2
(45) Date of Patent: May 5, 2026

(54) APPARATUSES, COMPUTER-IMPLEMENTED METHODS, AND COMPUTER PROGRAM PRODUCTS FOR PREDICTING VEHICLE COLLISION

(71) Applicant: Honeywell International Inc., Charlotte, NC (US)

(72) Inventors: Anil Kumar Sati Jayaramaiah, Bangalore (IN); Chandrashekar Shankarappa, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 47 days.

(21) Appl. No.: 18/655,660

(22) Filed: May 6, 2024

(65) Prior Publication Data

US 2025/0148926 A1 May 8, 2025

(30) Foreign Application Priority Data

Nov. 7, 2023 (IN) .............................. 202311075999

(51) Int. Cl.
*G08G 5/04* (2006.01)
*G01S 13/06* (2006.01)
(Continued)

(52) U.S. Cl.
CPC .............. *G08G 5/80* (2025.01); *G01S 13/06* (2013.01); *G01S 13/933* (2020.01); *G08G 5/22* (2025.01);
(Continued)

(58) Field of Classification Search
CPC ...................................................... G01S 13/06
See application file for complete search history.

(56) References Cited

U.S. PATENT DOCUMENTS 6,314,366 B1    11/2001  Farmakis et al.
8,744,737 B2 *   6/2014  D'Angelo ................ G08G 5/25
                                                                        701/120
(Continued)

FOREIGN PATENT DOCUMENTS

DE       102015224803 A1    6/2017
EP            3683780 A1    7/2020
(Continued)

OTHER PUBLICATIONS

Extended European Search Report Mailed on Apr. 11, 2025 for EP Application No. 24207464, 11 page(s).

*Primary Examiner* — Tan Q Nguyen
(74) *Attorney, Agent, or Firm* — ALSTON & BIRD LLP

(57) ABSTRACT

Embodiments of the disclosure provide for predicting collisions between vehicles and environment objects based at least in part on user input from a computing entity. Some embodiments receive, at a cloud computing environment, a user input from a computing entity, where the user input comprises an approximate location of an environment object. Some embodiments generate, using a machine learning model, a collision prediction involving the environment object and a vehicle based at least in part on the approximate location of the environment object and a trusted location of the vehicle. Some embodiments generate traffic data based at least in part on the collision prediction. Some embodiments provide a notification indicative of the traffic data to the vehicle and the computing entity.

20 Claims, 7 Drawing Sheets

(51) Int. Cl.

| | |
|---|---|
| *G01S 13/933* | (2020.01) |
| *G08G 5/22* | (2025.01) |
| *G08G 5/55* | (2025.01) |
| *G08G 5/57* | (2025.01) |
| *G08G 5/72* | (2025.01) |
| *G08G 5/80* | (2025.01) |

(52) U.S. Cl.
   CPC ................. *G08G 5/55* (2025.01); *G08G 5/57* (2025.01); *G08G 5/727* (2025.01)

(56) References Cited

U.S. PATENT DOCUMENTS

| | | | |
|---|---|---|---|
| 9,417,325 B1 * | 8/2016 | Bry | ........................... G08G 5/55 |
| 10,140,877 B2 | 11/2018 | Ceccherelli et al. | |
| 10,586,462 B1 | 3/2020 | Stein et al. | |
| 2009/0027253 A1 | 1/2009 | Van Tooren et al. | |
| 2018/0096611 A1 * | 4/2018 | Kikuchi | ................... G08G 5/21 |
| 2020/0231148 A1 | 7/2020 | Panchangam et al. | |
| 2021/0256858 A1 * | 8/2021 | Gupta | ....................... G08G 5/80 |
| 2022/0058960 A1 | 2/2022 | Stein | |
| 2022/0309934 A1 | 9/2022 | Panchangam | |
| 2022/0366794 A1 | 11/2022 | Kingston | |
| 2023/0386347 A1 | 11/2023 | Parker et al. | |
| 2024/0150045 A1 * | 5/2024 | Stricklan | ................ B64G 1/247 |

FOREIGN PATENT DOCUMENTS

| | | |
|---|---|---|
| EP | 3129971 B1 | 6/2021 |
| GB | 2598971 A | 3/2022 |
| KR | 10-1863101 B1 | 6/2018 |

* cited by examiner

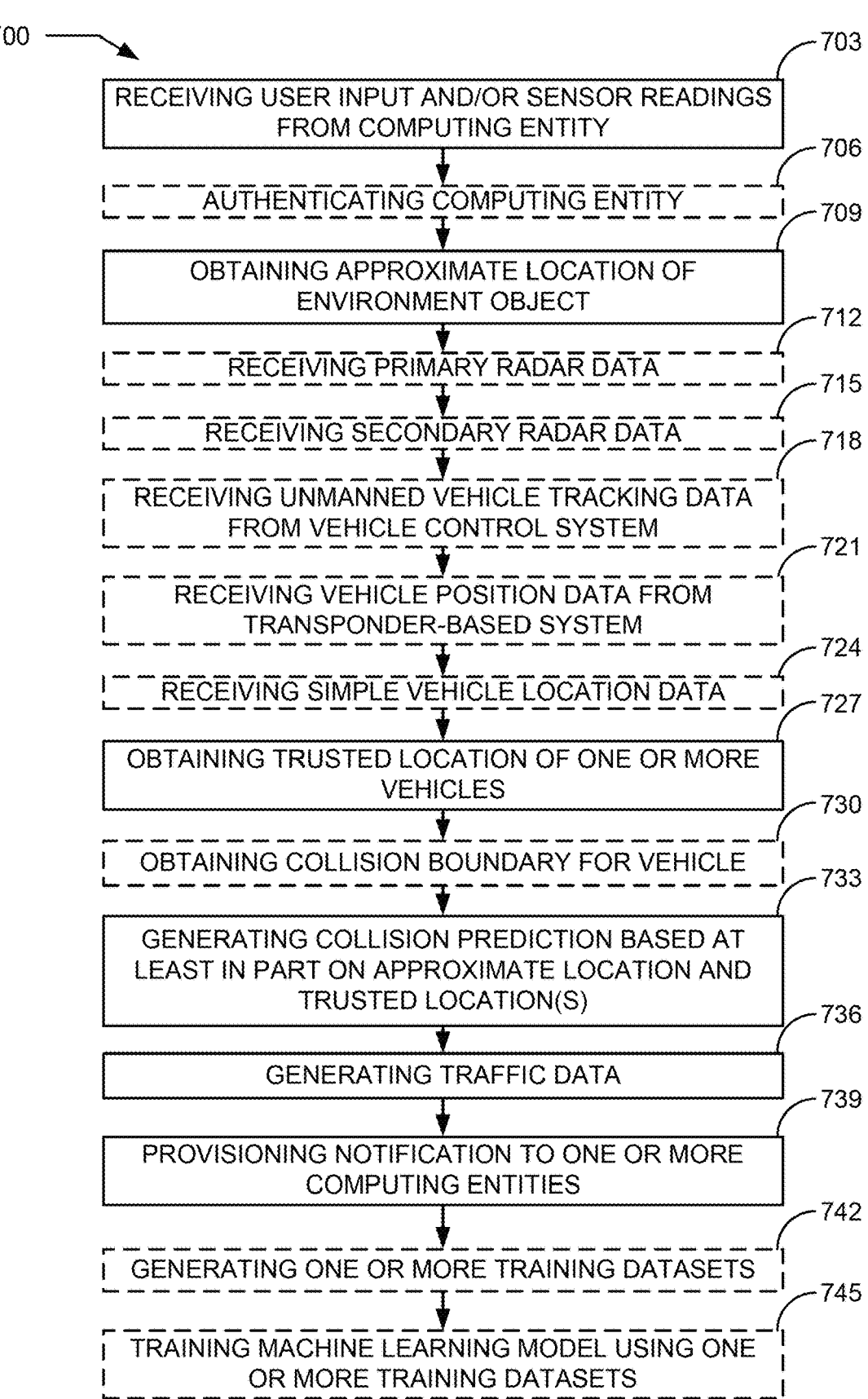

700

703 — RECEIVING USER INPUT AND/OR SENSOR READINGS FROM COMPUTING ENTITY

706 — AUTHENTICATING COMPUTING ENTITY

709 — OBTAINING APPROXIMATE LOCATION OF ENVIRONMENT OBJECT

712 — RECEIVING PRIMARY RADAR DATA

715 — RECEIVING SECONDARY RADAR DATA

718 — RECEIVING UNMANNED VEHICLE TRACKING DATA FROM VEHICLE CONTROL SYSTEM

721 — RECEIVING VEHICLE POSITION DATA FROM TRANSPONDER-BASED SYSTEM

724 — RECEIVING SIMPLE VEHICLE LOCATION DATA

727 — OBTAINING TRUSTED LOCATION OF ONE OR MORE VEHICLES

730 — OBTAINING COLLISION BOUNDARY FOR VEHICLE

733 — GENERATING COLLISION PREDICTION BASED AT LEAST IN PART ON APPROXIMATE LOCATION AND TRUSTED LOCATION(S)

736 — GENERATING TRAFFIC DATA

739 — PROVISIONING NOTIFICATION TO ONE OR MORE COMPUTING ENTITIES

742 — GENERATING ONE OR MORE TRAINING DATASETS

745 — TRAINING MACHINE LEARNING MODEL USING ONE OR MORE TRAINING DATASETS

FIG. 7

APPARATUSES, COMPUTER-IMPLEMENTED METHODS, AND COMPUTER PROGRAM PRODUCTS FOR PREDICTING VEHICLE COLLISION

CROSS REFERENCE TO RELATED APPLICATIONS

This application claims the benefit of and priority to India Provisional Application No. 202311075999, filed Nov. 7, 2023, entitled "APPARATUSES, COMPUTER-IMPLE-MENTED METHODS, AND COMPUTER PROGRAM PRODUCTS FOR PREDICTING VEHICLE COLLI-SION," the disclosure of which is incorporated herein by reference in its entirety.

TECHNOLOGICAL FIELD

Embodiments of the present disclosure are generally directed to predicting vehicle based at least in part on vehicle data uploaded to a cloud computing environment.

BACKGROUND

The increased density and diversity of vehicle traffic presents challenges to ensuring air and ground safety. For example, typical approaches to vehicle traffic control rely on radar systems and vehicles equipped with transponders that broadcast vehicle position data. However, there exists an increasing volume of vehicles that are unequipped with transponder-based systems, which may result in reduced capacity to monitor vehicle traffic and accurately predict vehicle collisions. For example, smaller vehicles (e.g., unmanned vehicles, small engine craft and/or the like) may have insufficient carrying capacity to support onboard posi-tion-broadcasting systems, such as traffic collision avoid-ance system (TCAS) or automatic dependent surveillance-broadcast (ADS-B). Even in instances where such equipment may be provisioned to a vehicle, exchange of vehicle position data between different vehicle types may be unsupported due to design differences in the position-broad-casting systems. Additionally, reduced vehicle dimensions may reduce vehicle radar detectability due in part to reduced radar signatures and/or increased vehicle traffic density that obfuscates smaller vehicles.

Applicant has discovered various technical problems associated with predicting collisions between vehicles and environment objects. Through applied effort, ingenuity, and innovation, Applicant has solved many of these identified problems by developing the embodiments of the present disclosure, which are described in detail below.

BRIEF SUMMARY

In general, embodiments of the present disclosure herein provide for prediction of collisions between vehicles and other environment objects based at least in part on aggre-gated vehicle position data indicative of vehicle and object locations. For example, embodiments of the present disclo-sure provide for prediction of collisions between a vehicle and an environment object based at least in part on a trusted location of the vehicle and an approximate location of the environment object, where the approximate location of the environment object may be generated based at least in part on one or more user inputs describing a position of the environment object. Other implementations for predicting collisions will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for collision prediction is provided. The computer-implemented method is executable utilizing any of a myriad of computing device(s) and/or combinations of hardware, software, firmware. In some example embodiments an example computer-implemented method includes receiving, at a cloud computing environ-ment, a user input from a computing entity, where the user input includes an approximate location of an environment object. In some embodiments, the method includes gener-ating, at the cloud computing environment and using a machine learning model, at least one collision prediction involving the environment object and at least one vehicle based at least in part on the approximate location of the aerial object and a trusted location of the at least one vehicle. In some embodiments, the method includes generating traf-fic data based at least in part on the at least one collision prediction and providing a notification indicative of the traffic data to the at least one vehicle and the computing entity.

In some embodiments, the computing entity embodies a device onboard an aerial vehicle. In some embodiments, the user input originates from a user-controlled device in an environment external to the at least one vehicle. the user input further includes an approximate speed of the environ-ment object. In some embodiments, the method includes generating the at least one collision prediction further based at least in part on the approximate speed of the environment object. In some embodiments, the method includes gener-ating the at least one collision prediction further based at least in part on a predefined collision boundary. In some embodiments, the method includes receiving, at the cloud computing environment, the predefined collision boundary from a computing entity associated with the at least one vehicle.

In some embodiments, the trusted location of the at least one vehicle is based at least in part on an upload of primary radar data to the cloud computing environment from a primary radar system. In some embodiments, the primary radar data is associated with a geozone including the approximate location of the environment object and includes vehicle position data associated with the at least one vehicle. In some embodiments, the trusted location of the at least one vehicle is based at least in part on an upload of secondary radar data to the cloud computing environment from a secondary radar system. In some embodiments, the second-ary radar data is associated with a geozone including the approximate location of the environment object and includes an identifier for the at least one vehicle and vehicle position data associated with the at least one vehicle.

In some embodiments, the at least one vehicle is an unmanned vehicle remotely controlled by a control station located within a predetermined proximity of a geozone including the approximate location of the aerial object. In some embodiments, the trusted location of the at least one vehicle is based at least in part on unmanned vehicle tracking data received at the cloud computing environment from the control station. In some embodiments, the trusted location of the at least one vehicle is based at least in part on vehicle position data received at the cloud computing envi-ronment from a traffic collision avoidance system (TCAS) of the at least one vehicle.

In some embodiments, the at least one vehicle is without a TCAS and the trusted location of the at least one vehicle is based at least in part on simple vehicle location data received at the cloud computing environment. In some embodiments, the cloud computing environment receives the simple vehicle location data from a satellite-based position system of the at least one vehicle. In some embodiments, the trusted location of the at least one vehicle is based at least in part on vehicle position data received at the cloud computing environment from an automatic dependent surveillance broadcast (ADS-B) system of the at least one vehicle. In some embodiments, the method includes generating a training dataset based at least in part on the at least one collision prediction. In some embodiments, the method includes retraining the machine learning model using the training dataset.

In some embodiments, the method includes determining a plurality of vehicles located within a geozone including the approximate location of the environment object. In some embodiments, the method includes providing a respective notification indicative of the traffic data to the plurality of vehicles. In some embodiments, the method includes obtaining a subscriber list including a plurality of vehicle identifiers. In some embodiments, the method includes determining a subset of the plurality of vehicles based at least in part on the subscriber list and respective vehicle identifiers for the plurality of vehicles, where the providing of the respective notification is limited to the subset of the plurality of vehicles. In some embodiments, the method includes receiving the respective vehicle identifiers for the plurality of vehicles from a vehicle traffic control system. In some embodiments, the method includes causing rendering of a graphical user interface (GUI) on a display of a computing device associated with the at least one vehicle. In some embodiments, the GUI includes the notification and a three-dimensional mapping of the geozone including at least one indicia indicative of the at least one collision prediction.

In accordance with another aspect of the present disclosure, a computing apparatus for collision prediction is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for collision prediction is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
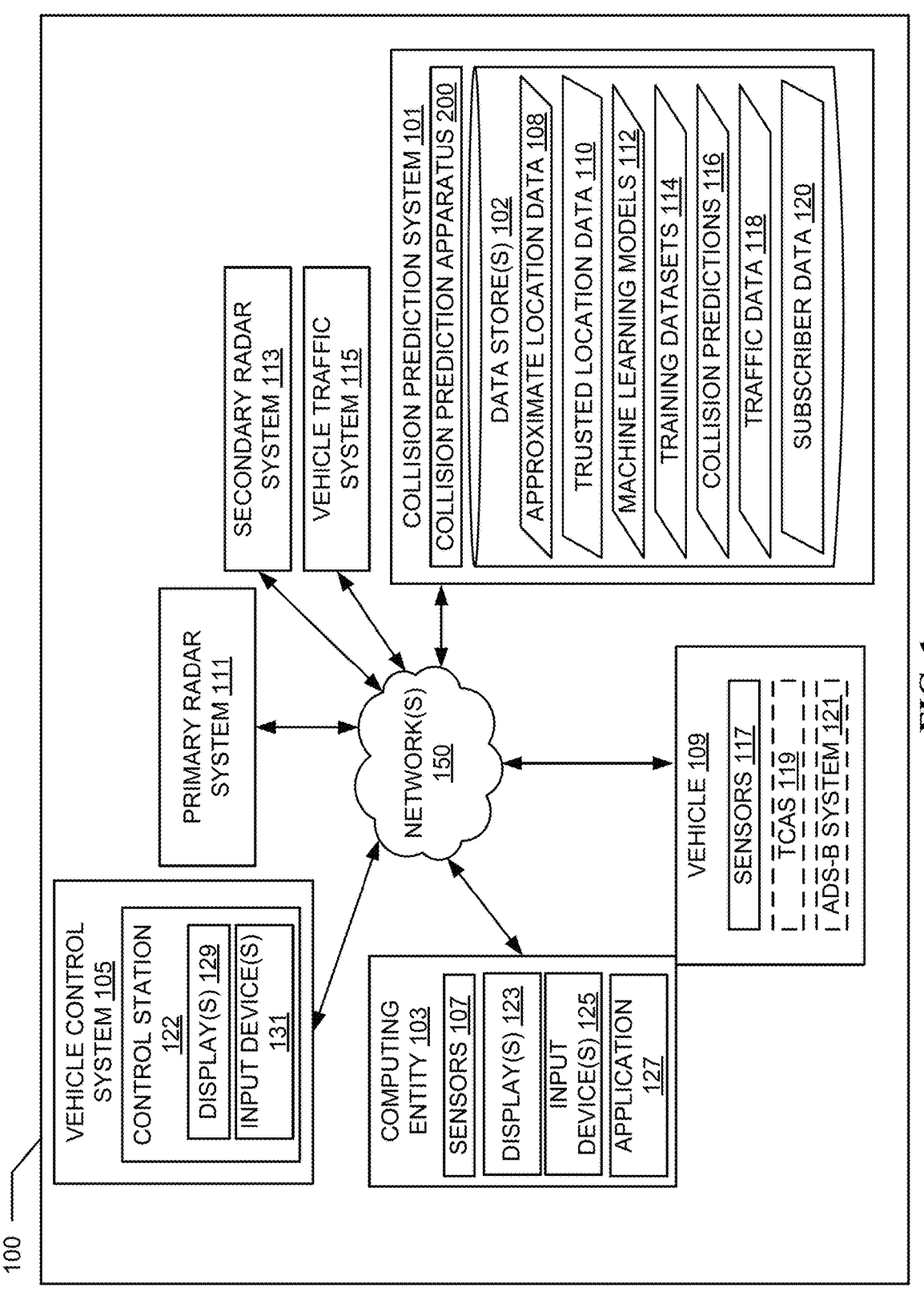

Having thus described the embodiments of the disclosure in general terms, reference now will be made to the accompanying drawings, which are not necessarily drawn to scale, and wherein:

FIG. 1 illustrates a block diagram of a networked environment that may be specially configured within which embodiments of the present disclosure may operate.

Figure 2:
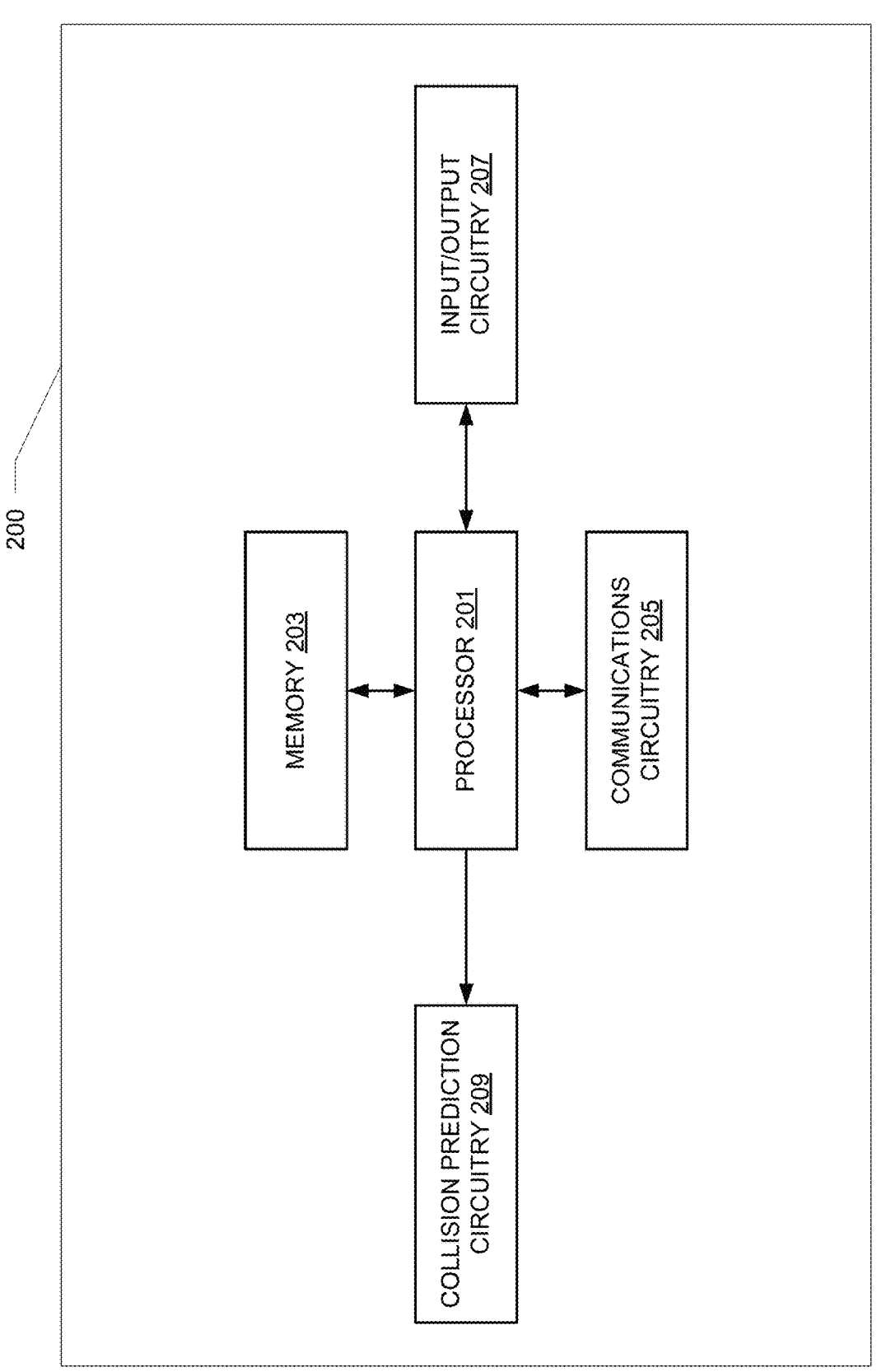

FIG. 2 illustrates a block diagram of an example apparatus that may be specially configured in accordance with at least some example embodiments of the present disclosure.

Figure 3:
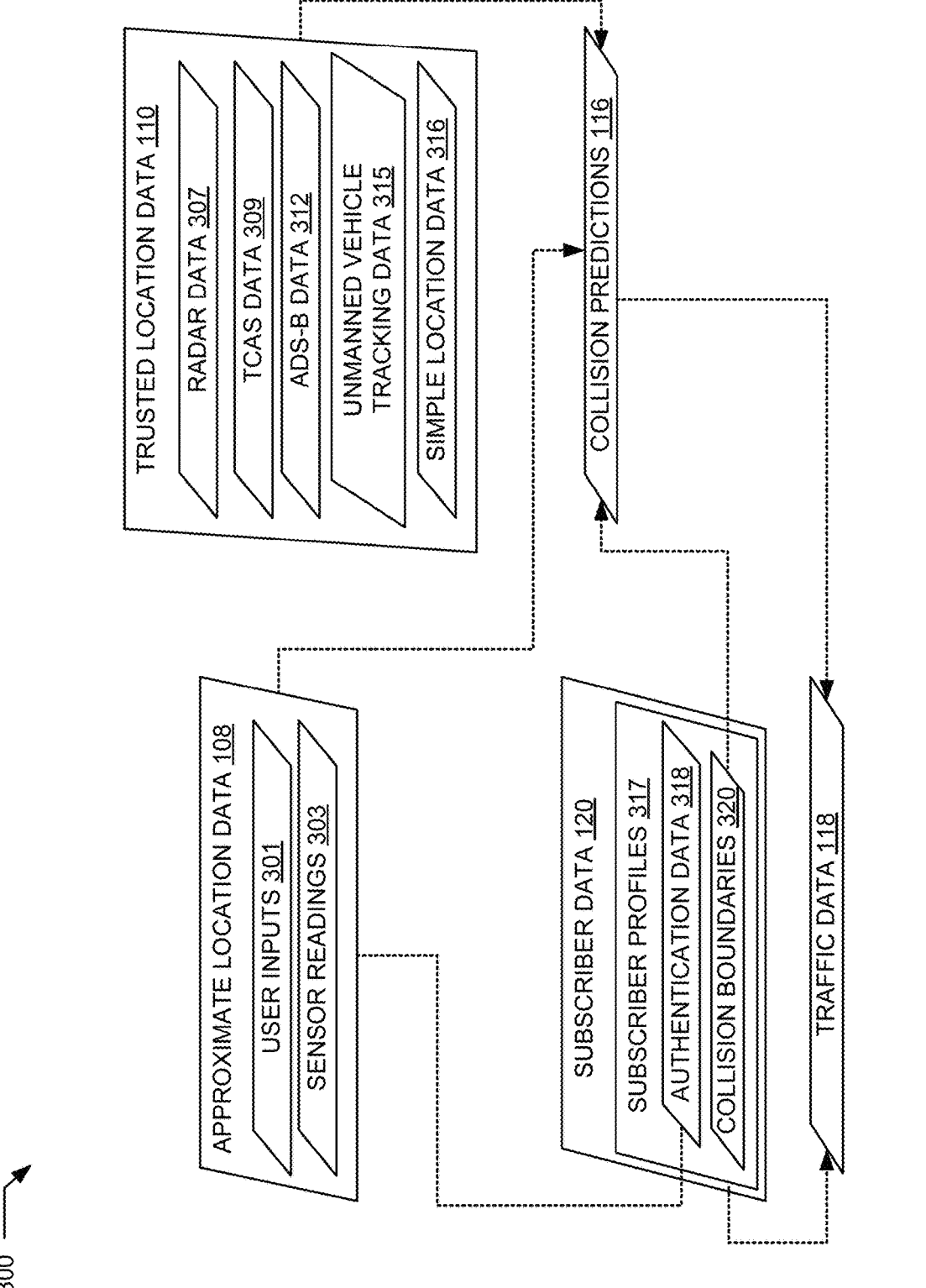

FIG. 3 illustrates an example data architecture in accordance with at least some example embodiments of the present disclosure.

Figure 4:
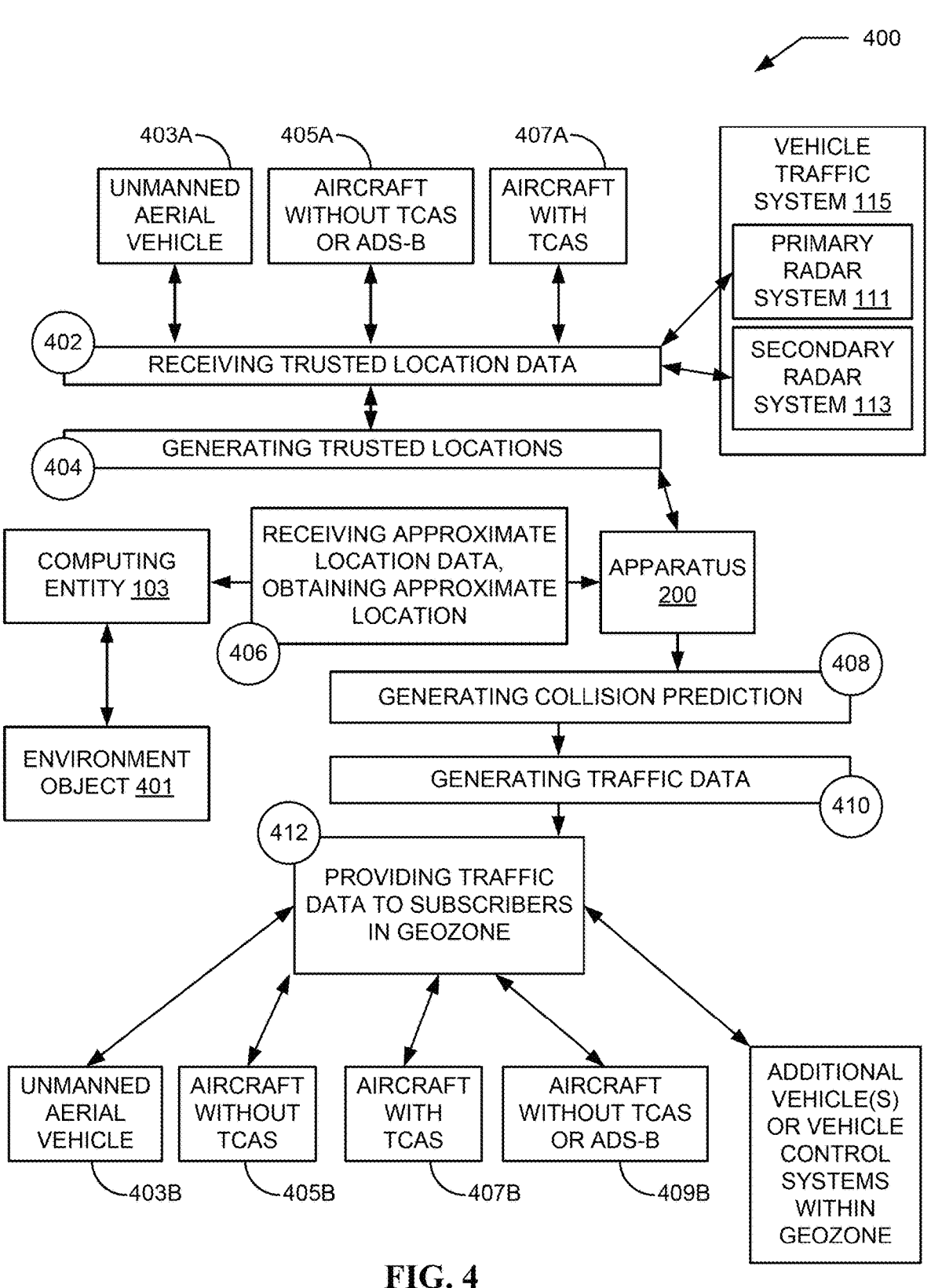

FIG. 4 illustrates a diagram of an example workflow for predicting collisions in an aerial environment context in accordance with at least some example embodiments of the present disclosure.

Figure 5:
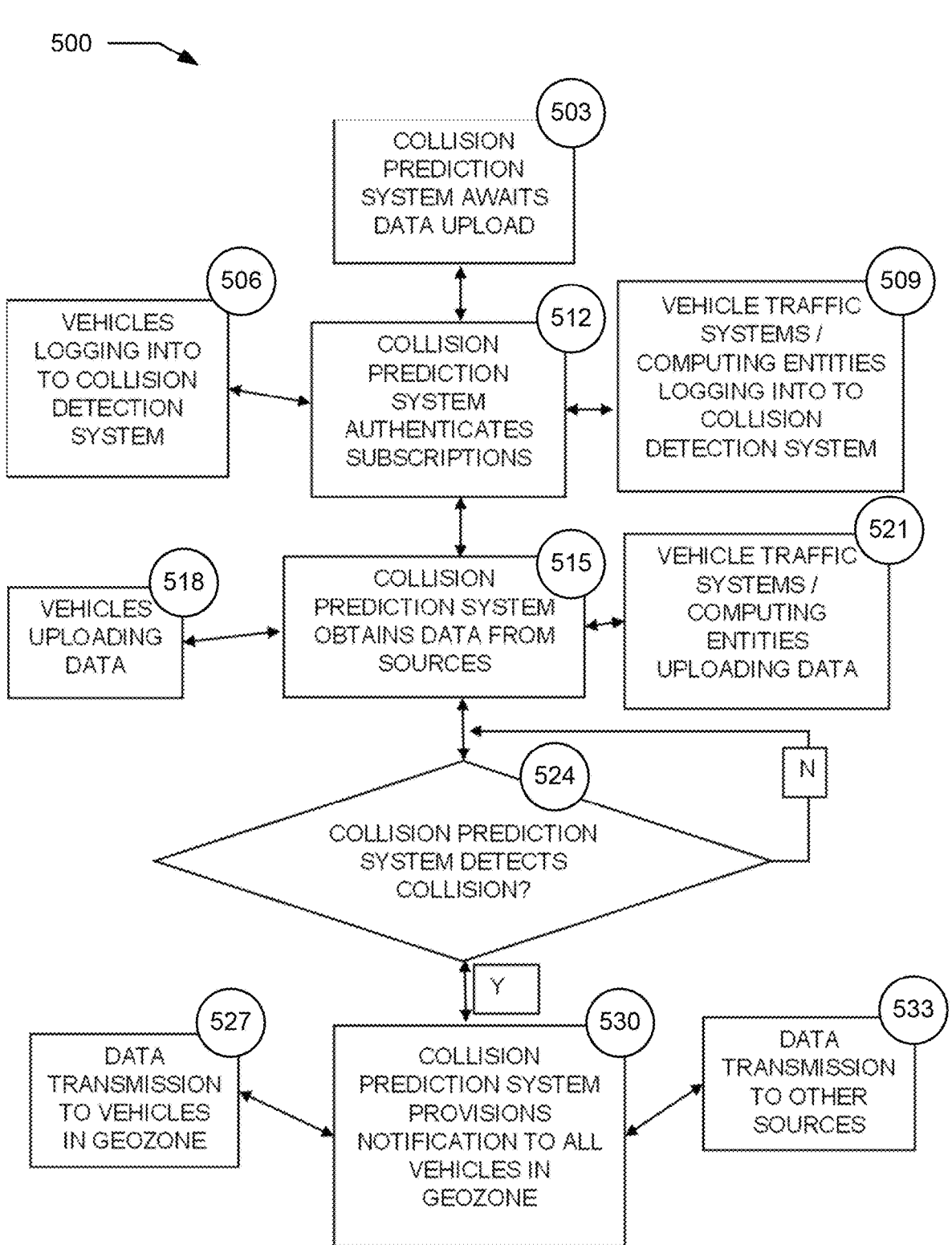

FIG. 5 illustrates a diagram of an example workflow for detecting collisions in accordance with at least some example embodiments of the present disclosure.

Figure 6:
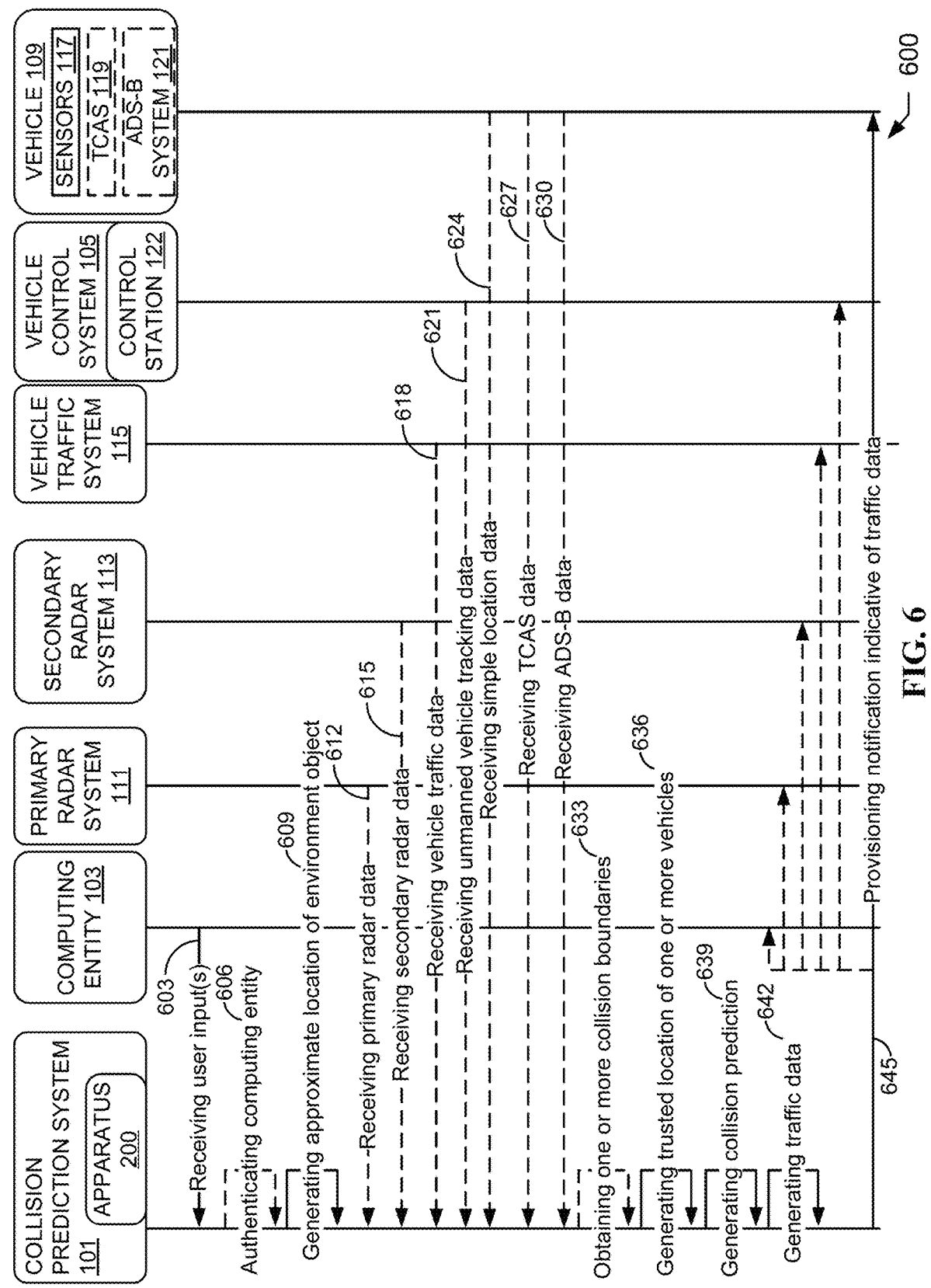

FIG. 6 illustrates a functional band diagram depicting operations of an example workflow for generating a collision prediction in accordance with at least some example embodiments of the present disclosure.

FIG. 7 illustrates a flowchart depicting operations of an example process for generating a collision prediction in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of predicting collisions between vehicles and environment objects, such as other vehicles, aerostats, biologicals, and/or the like. Previous approaches to predicting collisions may rely upon vehicles actively broadcasting their respective locations and/or radar systems that detect vehicle positions. However, such approaches may fail to predict collisions involving vehicles that lack suitable equipment to broadcast their location, operate beneath a radar system's field of operation, or present a small radar signature. Additionally, vehicles of varying class, make, type, and/or the like may lack compatible communication systems that enable exchange of vehicle position data. For example, a vehicle may lack a transponder-based system utilized by other vehicles to broadcast their respective positions, trajectories, and/or the like, and avoid collisions. As another example, an unmanned aerial vehicle (UAV) may operate at an altitude and/or demonstrate a sufficiently small profile such that radar systems are unable to detect the vehicle. In still another example, an aerostat, biological, or other environment object may be detected by an observer, such as a skywatcher; however, existing systems for predicting vehicle collisions may be unable to communicate with such observers and be alerted to environment objects. In such instances, the lack of intercommunication between vehicles, potential undetectability of environment objects, and inability to intake observations of environment objects may increase a likelihood of collision between vehicles or between a vehicle and an environment object.

Embodiments of the present disclosure overcome the technical challenges of collision prediction and exchange of vehicle information at least in part by receiving and aggregating vehicle information at a cloud computing environment and generating collision predictions based at least in part on the aggregated vehicle information. The various embodiments of the present disclosure may communicate the collision predictions, vehicle information, and/or the like to vehicles, vehicle control systems, vehicle traffic systems, and other computing entities to reduce the likelihood of collisions and improve intercommunication of vehicle information in instances where vehicles, computing entities, and/or the like are unable to intercommunicate directly.

Some embodiments of the present disclosure provide a collision prediction system to which vehicles, vehicle control systems, vehicle traffic systems, and other computing entities may provide data indicative of approximate locations of environment objects, trusted locations of vehicles, and/or the like. Some embodiments receive, at the cloud computing environment and from a computing entity, user inputs, sensor readings, and/or the like that indicate an approximate position of an environment object. In some contexts, the user inputs, sensor readings, and/or the like include images of the environment object, approximate geographic coordinates of the environment object, and other approximate data, such as speed, altitude, bearing, and/or the like. Some embodiments authenticate the computing entity to prevent upload of data to the computing environment from unauthorized actors.

Some embodiments obtain a trusted location of one or more vehicles located within a geozone comprising the approximate location of the environment object. Some embodiments generate the trusted location based at least in part on vehicle position data generated by one or more transponder-based systems, primary radar data, secondary radar data, unmanned vehicle tracking data, simple vehicle location data, and/or the like. For example, some embodiments receive secondary radar data associated with a geozone comprising the approximate location of the environment object, where the radar data indicates a trusted location and a vehicle identifier of one or more vehicles located within the zone. As another example, some embodiments receive vehicle position data from a TCAS or ADS-B system of a vehicle, where the trusted location of one or more vehicles may be generated based at least in part on the vehicle position data. In some contexts, the vehicle position data may include identifiers, locations, bearings, speeds, altitudes, and/or the like of all transponder-equipped vehicles within communication range of the TCAS or ADS-B system. For example, some embodiments may provision the vehicle position data to vehicles that are unequipped with transponder-based systems, which may overcome technical challenges associated with providing real-time traffic monitoring capabilities to vehicles that are unable to receive vehicle position data from other vehicles via transponder-based systems.

Some embodiments generate a collision prediction based at least in part on the approximate location of the environment object and the trusted location of one or more vehicles. In some contexts, the collision prediction is generated using a machine learning model trained to predict a likelihood that an environment object will move or otherwise be positioned within a collision boundary of a vehicle. Some embodiments generate traffic data based at least in part on the collision prediction. In some contexts, the traffic data indicates a predicted position and/or time interval at which a potential collision may occur. Some embodiments provision a notification indicative of the traffic data to the vehicles, vehicle control systems, computing entities, and/or the like that are located within the geozone that comprises the approximate location of the environment object. The traffic data (and collision predictions indicated thereby) provided by the cloud computing environment may overcome technical challenges of achieving intercommunication and positional awareness between vehicles, vehicle control systems, and/or the liked that are incapable of directly communicating with each other. Additionally, the accuracy and robustness of collision predictions may be improved based at least in part on the increased diversity of data sources that be utilized to generate the collision predictions.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, and/or the like. In some embodiments, the vehicle is piloted by a human operator onboard the vehicle. For example, in an aerial context, the vehicle may be a commercial airliner operated by a flight crew. In some embodiments, the vehicle is remotely controllable such that a remote operator may initiate and direct movement of the vehicle. Additionally, in some embodiments, the vehicle is unmanned. For example, the vehicle may be a powered, aerial vehicle that does not carry a human operator and is piloted by a remote operator using a control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with urban air mobility (UAM).

"UAM" refers to urban air mobility, which includes all aerial vehicles and functions for aerial vehicles that are capable of performing vertical takeoff and/or vertical landing procedures. Non-limiting examples of UAM aerial vehicles include passenger transport vehicles, cargo transport vehicles, small package delivery vehicles, unmanned aerial system services, autonomous drone vehicles, and ground-piloted drone vehicles, where any such vehicle is capable of performing vertical takeoff and/or vertical landing.

"Vehicle control system" refers to any hardware, software, firmware, and/or combination thereof, that remotely controls operation of one or more vehicles. In some embodiments a vehicle control system controls operation of the one or more vehicles via input of instructions and/or commands from a human and/or automated computing entity. For example, a vehicle control system may be a human and/or automated computing entity that, via input of instructions and/or commands, controls operation of one or more vehicles via a control station. In some embodiments, a zone-remote control system may embody specially-config- ured computing resources and functions for UAM control.

"Control station" refers to any number of computing device(s) and/or other system(s) embodied in hardware, software, firmware, and/or the like that control, operate, receive and maintain data respective to, and/or monitor one or more vehicles. For example, a control station may include or embody a computing terminal by which one or more vehicles are remotely operated. In some embodiments, the control station includes one or more displays by which data corresponding to one or more vehicles and/or vehicle traffic is displayed to an operator of the control station. In some embodiments, the control station includes one or more input devices by which instructions or commands for controlling vehicles are received by the control station via user input provided to an input device of a vehicle control system.

"Unmanned vehicle tracking data" refers to any data usable to derive a current or previous position or movement of an unmanned vehicle. In some embodiments, unmanned vehicle tracking data includes historical locations or a real- time location of an unmanned vehicle. In some embodi- ments, unmanned vehicle tracking data includes geographic coordinates that indicate a location of an unmanned vehicle. For example, the unmanned vehicle tracking data for an unmanned vehicle may include a value of longitude, lati- tude, altitude, global area reference system (GARS) code, open location code, geohash, and/or the like, that by which a position of the unmanned vehicle may be determined. In some embodiments, unmanned vehicle tracking data includes vehicle speed, altitude, bearing, heading, intended course of travel, and/or the like. For example, unmanned vehicle tracking data for an unmanned vehicle may include an airspeed, a ground speed, a vehicle bearing, and a flight path. In some embodiments, unmanned vehicle tracking data includes one or more identifiers that uniquely identify the corresponding unmanned vehicle and/or a control station that remotely operates the unmanned vehicle.

"Environment object" refers to any physical material or article having capacity to enter into a collision with a vehicle. In some embodiments, an object is in a particular environment, for example an "aerial object" refers to any environment object that has the capacity to enter into a collision with an aerial vehicle in an aerial environment, and a "ground object" refers to any environment object that has the capacity to enter into a collision with a ground vehicle in a ground environment. In some embodiments, an envi- ronment object includes a vehicle. For example, a ground object may be an automobile, motorcycle, bicycle, and/or the like. As another example, an aerial object may be an unknown or unrecognized unmanned aerial vehicle, aerostat, and/or the like. As another example, an aerial object may be a balloon or airship. In some embodiments, an environment object may be a living being or natural phe- nomena. For example, an aerial object may be a bird or flock thereof. As another example, an aerial object may be pre- cipitation, such as large hailstones, and/or the like. As another example, an aerial object may include volcanic emissions, meteorites, and/or the like.

"Geozone" refers to any physically-defined area. In some embodiments, a geozone is a statically-defined physical area, such as an airspace, country boundaries or other political or economic territory boundaries, a natural geo- graphic region (e.g., bodies of water, islands, river basins, peninsulas, and/or the like), or a location of infrastructure (e.g., a ground control center, warehouse, airport or other transportation hub, customs processing center, port of entry, and/or the like). In some embodiments, a geozone is a dynamically-defined physical area that may increase or decrease in dimension and/or change location. For example, a geozone may be a region around a vehicle in which dimensions of the region are based at least in part on a user input, communication range, safety factor, and/or the like.

"Position" refers to any physically-defined location in an environment. In some embodiments, a position is expressed by one or more geographic coordinates, such as longitude, latitude, altitude, global area reference system (GARS) code, open location code, geohash, and/or the like. In some embodiments, in addition to a physically-defined location, "position" further refers to a particular time or time interval at the physically-defined location. In some embodiments, position further includes an indicated airspeed (IAS), true airspeed (TAS), groundspeed (GS), calibrated airspeed (CAS), bearing, heading, and/or the like of a vehicle.

"Traffic data" refers to any data that describes positions of vehicles and environment objects within a geozone, and where such data is usable to indicate potential collisions of one or more vehicles with one or more environment objects. For example, traffic data may include geographic coordi- nates, headings, altitudes, speeds, and identifiers, and/or the like, of one or more aircraft and one or more environment objects within a particular region of airspace. In some embodiments, traffic data may be generated based at least in part on a collision prediction. In some embodiments, traffic data includes indications of collision predictions, such as predicted distance ranges between respective vehicles, between vehicles and one or more environment objects, and/or the like. In some embodiments, traffic data includes an indication of whether an environment object is predicted to move within a predefined collision boundary of a vehicle. For example, traffic data may indicate that an environment object is predicted to move within 100 feet (ft), 200 ft, 50 ft, or another suitable range, of an aircraft.

"Collision prediction" refers to any data object that mea- sures or indicates a likelihood of a collision between a vehicle and an environment object. In some embodiments, a collision prediction indicates whether respective courses of travel for a vehicle and an environment object are expected to intersect, potentially resulting in a collision between the vehicle and the environment object. Additionally, or alter- natively, in some embodiments, a collision prediction indi- cates whether a collision between a vehicle and an environ- ment object has already occurred or is currently occurring. In some embodiments, a collision prediction includes a position and/or time at which a vehicle and an environment object are predicted to collide. Alternatively, or additionally, in some embodiments, a collision prediction includes a position and/or time at which a collision is predicted to have occurred between a vehicle an environment object. In some embodiments, a collision prediction indicates whether an environment object is predicted to move within a predefined collision boundary of an object, or vice versa. For example, a collision prediction may indicate whether an environment object is predicted to move within 200 ft, 100 ft, 50 ft, 5 ft, 0 ft, or another suitable value, of a vehicle. In some embodiments, a collision prediction indicates a level of collision risk, which may be based at least in part on a predicted minimal distance between an environment object and a vehicle. For example, a collision prediction may include one of several risk categories (e.g., zero, low, medium, high, guaranteed, and/or the like) that correspond to different minimal distances ranges between an environment object and a vehicle (e.g., more than 1000 ft, less than 500 ft, less than 100 ft, less than 50 ft, and/or the like).

"Collision boundary" refers to any objective or relational measure of distance and/or time between a vehicle and an environment object that defines a tolerance for the probability of intersection between the vehicle and the environment object. In some embodiments, a collision boundary includes a measure of distance between a vehicle and environment objects such that environment objects positioned within (or predicted to move within) the distance are associated with a risk of colliding with the vehicle. For example, a collision boundary may correspond to a region of airspace extending 100 ft, 200 ft, 1000 ft, or another suitable value, in all directions from an aircraft. In some embodiments, a collision boundary is defined for a vehicle based at least in part on a user input from an entity in control of or otherwise associated with the vehicle. For example, an owner of an aircraft may define the collision boundary for the aircraft by providing a user input to a computing device, which may provision the user input and/or collision boundary definition to a collision prediction system. In some embodiments, a collision boundary is defined for a vehicle based at least in part on a vehicle type with which the vehicle is associated. For example, a commercial jetliner may be associated with a first collision boundary, a small engine personal aircraft may be associated with a second collision boundary that is less than, greater than or equal to the first collision boundary, and an unmanned aerial vehicle (UAV) may be associated with a third boundary that is less than, greater than, or equal to the first or second collision boundaries. In some embodiments, a collision boundary is dynamically defined based at least in part on vehicle volume within a geozone. For example, a collision boundary for a vehicle may be reduced or increased when the vehicle is within a geozone having a number of vehicles less than or greater than a predefined threshold.

"Computing entity" refers to any electronic equipment embodied in hardware, software, firmware, and/or any combination thereof, by which any number of persons or automated computing entities may provide input indicative of an environment object and/or approximate position of the environment object. The computing entity may embody any number of computing devices and/or other systems embodied in hardware, software, firmware, and/or the like that receive user inputs, generate approximate positions of environment objects based at least in part on user inputs, and provision the user inputs and/or approximate positions to a collision prediction system. For example, a computing entity may be a handheld computing device of an individual with visual line of sight to an environment object. The handheld computing device may receive, via user input, an approximate location of the environment object. Alternatively, or additionally, the handheld computing device may include an imaging system, such as a camera, by which the individual captures one or more images of the environment object and based upon which an approximate location of the environment object may be generated. In some embodiments, a computing entity is embodied as a device onboard an aerial vehicle. For example, a computing entity may be embodied as a handheld computing device carried by a crew member or passenger of an aircraft. In some embodiments, a computing entity embodied as a device in an environment external to a vehicle. For example, the computing entity may be embodied as a user-controlled device in a ground environment external to the vehicle. In some contexts, a computing entity may be embodied as a user-controlled device carried by a skywatcher or other individual in a ground environment that observes vehicle traffic in an aerial environment.

"Environment" refers to a physically-defined area. "Aerial environment" refers to an air-based environment. In some embodiments, an aerial environment embodies a region of atmosphere that extends above, but excludes, a terrestrial surface.

"Ground environment" refers to a surface-based environment. In some embodiments, a ground environment embodies a region of a terrestrial surface.

"Approximate location" refers to electronically managed data representing any position of an environment object that is generated based at least in part on input from a computing entity. In some embodiments, an approximate location includes approximate geographic coordinates, altitude, bearing, speed, and/or the like for an environment object, which may be generated based at least in part on input provided to the computing entity from an individual, an automated computing entity, one or more sensors, and/or the like. For example, an approximate location of an environment object may be generated by a computing entity based at least in part on one or more images of the environment object captured via an imaging system connected to the computing entity. As another example, the approximate location may be generated based at least in part on one or more sensors that identify a region of an aerial environment occupied by the environment object. As another example, the approximate location may be generated based at least in part on one or more sensors that estimate a distance between the environment object and the computing entity. In some embodiments, an approximate location of an environment object includes or is associated with an approximate speed for the environment object. For example, a computing entity may receive user input that defines a plurality of approximate positions of an environment object over a predetermined time interval and generate an approximate speed of the environment object based at least in part on the approximate positions. As another example, a computing entity may include one or more sensors and processing element that generate and process one or more readings of the environment object (e.g., images, video, distance measurements, and/or the like) to generate an approximate speed of the environment object.

"Trusted location" refers to any position of a vehicle that is generated based at least in part on vehicle position data received from a system onboard the vehicle or from one or more radar systems. In some embodiments, the trusted location is generated based at least in part on vehicle position data generated by a TCAS of one or more vehicles, an ADS-B of the vehicle, and/or the like. In some embodiments, the trusted location is generated based at least in part on vehicle position data received from a primary radar system, a secondary radar system, and/or the like. In some embodiments, the trusted location is generated based at least in part on vehicle position data received from a satellite-based positioning system of the vehicle, where the vehicle lacks a transponder, TCAS, and/or ADS-B. In some embodiments, in instances where a vehicle is without a transponder, TCAS, ADS-B, and/or the like, vehicle position data that is generated from a satellite-based positioning system of the vehicle may be referred to as "simple location data." For example, a trusted location for an unmanned aerial vehicle (UAV) that lacks a transponder may be generated based at least in part on GPS signals received and processed by a GPS receiver circuit aboard the vehicle. In such contexts, the GPS signals (e.g., vehicle position data) received from the UAV may be referred to as simple location data.

"Vehicle position data" refers to any data indicative of a position of a vehicle or usable to generate the position of the vehicle. In some embodiments, vehicle position data includes geographic coordinates of a vehicle, which may be received from one or more onboard vehicle systems via a transponder or other communication apparatus. In some embodiments, vehicle position data includes geographic coordinates for the vehicle that are generated by one or more radar systems or other vehicle traffic systems. In some embodiments, vehicle position data includes a heading, bearing, course of travel, one or more speeds, and/or the like, of one or more vehicles. In some embodiments, vehicle position data includes vehicle traffic data generated by one or more onboard systems of the vehicle, such as a TCAS or ADS-B system. For example, vehicle position data may include identifiers, locations, bearings, speeds, and/or the like of all transponder-equipped vehicles within communication range of the TCAS or ADS-B system.

"Primary radar system" refers to any electronic equipment embodied in hardware, software, firmware, and/or any combination thereof, that emits radiofrequency (RF) energy and detects reflections of RF energy from objects. For example, a primary radar system may emit radio wave pulses and detect a vehicle based on detecting reflections of the radio wave pulses from the vehicle. In some embodiments, a primary radar system includes a transmitter that emits RF energy and one or more antennae that receive reflected RF energy from one or more objects. The object may act as a passive element that reflects RF energy emitted by the transmitter. In some embodiments, the primary radar system generates primary radar data based at least in part on reflected RF energy received by the antennae. In some embodiments, the primary radar system (or another system that receives the primary radar data) generates a trusted location of one or more objects based at least in part on the primary radar data. For example, the primary radar system may generate a trusted location of a vehicle based at least in part on primary radar data generated from EF energy emitted at and reflected by the vehicle.

"Primary radar data" refers to any data generated by a primary radar system or generated based at least in part on reflected EF energy received by the primary radar system. In some embodiments, primary radar data includes a wave transit time that corresponds to an interval between emittance of RF energy from the primary radar system and receipt of reflected RF energy from an object. In some embodiments, primary radar data includes an object distance measurement generated by the primary radar system (or another system in communication therewith) based at least in part on a wave transit time. In some embodiments, primary radar data includes an angle or bearing based at least in part on the position of radar system antennae in azimuth. In some embodiments, the primary radar data includes a radial velocity of RF energy based at least in part on the Doppler effect as applied to RF energy emitted from the primary radar system. In some embodiments, the primary radar data includes location data generated by the primary radar system based at least in part on wave transmit time, object distance measurement, angle, bearing, radial velocity, and/or the like. In some embodiments, the primary radar data is associated with a particular geozone. For example, the primary radar data may be associated with an airspace or subregion thereof.

"Secondary radar system" refers to any electronic equipment embodied in hardware, software, firmware, and/or any combination thereof, that emits RF energy at an object and receives signal from the object, where the RF energy emitted from the secondary radar system causes the object to emit the signal. For example, the secondary radar system may emit RF energy pulses that impact an object (referred to as "interrogation"), and the object may include means for detecting the RF energy pulses and transmitting a signal to the secondary radar system in response. In some embodiments, the secondary radar system receives signal from a transponder attached to or otherwise configured aboard a vehicle. In some embodiments, the transponder includes a receiver that receive RF energy from the secondary radar system and a transmitter that transmits signal to the secondary radar system in response to the transmitter receiving RF energy. In some embodiments, the secondary radar system (or another system in communication therewith) generates secondary radar data based at least in part on the signal. In some embodiments, the secondary radar system generates a trusted location of one or more objects based at least in part on the secondary radar data. For example, the primary radar system may generate a trusted location of a vehicle based at least in part on secondary radar data generated from EF energy emitted at the object and signal emitted from a transponder disposed within or on the object. In some embodiments, the signal encodes data associated with the transponder or object to which the transponder is affixed. For example, the signal may encode information that identifies the object, such as a vehicle identifier. As another example, the signal may encode information associated with the location of the object, such as geographic coordinates, altitude, bearing, velocity, and/or the like.

"Secondary radar data" refers to any data generated by a secondary radar system or based at least in part on signal received by the secondary radar system. In some embodiments, secondary radar data includes a wave transit time, object distance measurement, angle, bearing, radial velocity, and/or the like. In some embodiments, the secondary radar data includes location data generated by the secondary radar system based at least in part on signal received from a transponder and/or a wave transmit time, object distance measurement, angle, bearing, radial velocity, and/or the like generated based at least in part on the signal. In some embodiments, the secondary radar data includes geographic coordinates, object altitude, object speed, and/or the like, which may be decoded from signal received by the secondary radar system from a transponder. In some embodiments, the secondary radar data is associated with a particular geozone. For example, the secondary radar data may be associated with an airspace or subregion thereof. In some embodiments, the secondary radar data includes an identifier for an object. For example, the secondary identifier may include information that uniquely identifies a vehicle, such as an identity code of an aircraft.

"Satellite-based positioning system" refers to any system embodied in hardware, software, firmware, and/or any combination thereof, that relies on at least one satellite to identify a signal indicative of a position of the system, an associated vehicle, and/or one or more celestial bodies. In some embodiments, the signal includes data that provides (e.g., or from which may be generated) location coordinates of the satellite-based positioning system or a celestial body at one or more discrete time points. In some embodiments, the satellite-based positioning system is an artificial, planet-orbiting apparatus that transmits signal to one or more receiver circuits. In some contexts, the signal encodes position data may be referred to as "ephemeris" data or "ephemeris." As one example, a signal may be generated and transmitted by a global navigation satellite system (GNSS) or a regional navigation satellite system (RNSS). Example GNSSs and RNSSs from which signal may be obtained include Global Positioning System (GPS), Global Navigation Satellite System (GLONASS), BeiDou Navigation Satellite System, Galileo, Quasi-Zenith Satellite System, and India Regional Satellite System (IRNSS).

"Machine learning model" refers to any algorithm that utilizes learned parameters to generate a particular output, or plurality thereof, based at least in part on one or more inputs. Non-limiting examples of models include linear programming (LP) models, regression models, dimensionality reduction models, ensemble learning models, reinforcement learning models, supervised learning models, unsupervised learning models, semi-supervised learning models, Bayesian models, decision tree models, linear classification models, artificial neural networks, association rule learning models, hierarchical clustering models, cluster analysis models, anomaly detection models, deep learning models, feature learning models, and combinations thereof. In some embodiments, the machine learning model generates, as output, one or more collision predictions based at least in part on one or more inputs including an approximate location of one or more environment objects, a trusted location of one or more vehicles, and/or the like. For example, the machine learning model may generate a collision prediction based at least in part on an approximate location of an environment object and a trusted location of an aircraft, where the approximate location of the environment object is generated based at least in part on user input from a computing entity and the trusted location of the vehicle is generated based at least in part on primary radar data, secondary radar data, unmanned vehicle tracking data, TCAS-based vehicle position data, ADS-B-based vehicle position data, simple vehicle location data, and/or the like.

Example Systems and Apparatuses of the Disclosure

FIG. 1 illustrates a block diagram of a networked environment that may be specially configured within which embodiments of the present disclosure may operate. Specifically, FIG. 1 depicts an example networked environment 100. As illustrated, the networked environment 100 includes a collision prediction system 101, one or more computing entities 103, one or more vehicle control systems 105, one or more vehicles 109, one or more primary radar systems 111, one or more secondary radar systems 113, and one or more vehicle traffic systems 115.

In some embodiments, the collision prediction system 101 includes a collision prediction apparatus 200 (also referred to herein as "apparatus") that performs various functions and actions related to enacting techniques and processes described herein for prediction collisions, such as generating an approximate location of an environment object, generating a trusted location of a vehicle 109, and generating a collision prediction between the environment object and the vehicle 109 based at least in part on the approximate location and the trusted location. In some embodiments, the apparatus 200 includes one or more circuitries (e.g., physical, virtual, and/or the like) that intake and process data from other computing devices and systems including computing entities 103, vehicle control systems 105, vehicles 109, primary radar systems 111, secondary radar systems 113, vehicle traffic systems 115, and/or the like. In some embodiments, the apparatus 200 includes input/output circuitry that enables a computing entity 103, vehicle control system 105, vehicle 109, vehicle traffic system 115, and/or the like, to provide input to and receive output from the collision prediction system 101. For example, the input/output circuitry may include or embody user interfaces, input devices, and/or the like for receiving input from and providing output to a computing entity 103, vehicle 109, vehicle control system 105, vehicle traffic system 115, and/or the like.

In some embodiments, the apparatus 200 includes one or more circuitries or interfaces that communicate with computing entities 103, vehicle control systems 105, vehicles 109, vehicle traffic systems 115, and/or the like. For example, the apparatus 200 may include a communication interface that enables communication between the collision prediction system 101 and one or more computing entities 103. In some embodiments, the apparatus 200 includes or embodies a cloud computing environment configured to receive and aggregate data from computing entities 103, vehicle control systems 105, vehicles 109, vehicle traffic systems 115, and/or the like. For example, the cloud computing environment may receive respective uploads of primary radar data from a primary radar system 111, secondary radar data from a secondary radar system 113, unmanned vehicle tracking data from a vehicle control system 105, simple vehicle location data from a satellite-based position system of a vehicle 109, and/or the like.

In some embodiments, the cloud computing environment includes respective communication gateways for receiving data from computing entities 103, vehicle control systems 105, vehicles 109, vehicle traffic systems 115, and/or the like. For example, the apparatus 200 may include a first communication gateway that receives primary radar data from primary radar systems 111, a second communication gateway that receives secondary radar data from secondary radar systems 113, and a third communication gateway that receives user inputs, sensor readings, and/or the like from computing entities 103. As another example, the apparatus 200 may include one or more communication gateways that receive unmanned vehicle tracking data from vehicle control systems 105 and one or more communication gateways that receive vehicle position data from transponder-based systems of a vehicle 109, such as a TCAS 119 or ADS-B system 121.

In some embodiments, the apparatus 200 includes collision prediction circuitry that enables the collision prediction system 101 to carry out various functions described herein including generating collision boundaries for vehicles 109, generating collision predictions based at least in part on approximate locations of environment objects and trusted locations of vehicles 109, and generating traffic data based at least in part on a collision prediction. In some embodiments, via the apparatus 200, the collision prediction system 101 receives user inputs, sensor readings, and/or the like from a computing entity 103, where the user inputs, sensor readings, and/or the like indicate an approximate location of an environment object. Alternatively, in some embodiments, the collision prediction system 101 generates an approximate location of an environment object based on the user inputs, sensor readings, and/or the like. In some embodiments, the collision prediction system stores the user inputs, sensor readings, approximate location, and/or the like as approximate location data 108.

In some embodiments, the collision prediction system 101 generates a geozone based at least in part on the approximate location of the environment object. In some embodiments, the collision prediction system 101 receives vehicle position data for one or more vehicles 109. In some embodiments, the collision prediction system 101 generates trusted location data 110 based at least in part on the vehicle position data, where the trusted location data 110 indicates a trusted location of the vehicle 109. In some embodiments, the collision prediction system 101 generates a collision prediction 116 based at least in part on the approximate location data 108 for the environment object and the trusted location data 110 for one or more vehicles 109. In some embodiments, based at least in part on the trusted location(s), the collision prediction system 101 determines one or more vehicles 109 located within the geozone comprising the approximate location of the environment object. In some embodiments, the collision prediction system 101 generates the collision prediction 116 based at least in part on the approximate location data 108 of the environment object and the trusted location data 110 for the vehicles 109 that are located within the geozone. In some embodiments, the collision prediction system 101 generates the collision prediction 116 using one or more machine learning models 112 and based at least in part on approximate location data 108, trusted location data 110, one or more collision boundaries, and/or the like. In some embodiments, the collision prediction system generates traffic data 118 based at least in part on the collision prediction.

In some embodiments, the collision prediction system 101 includes one or more data stores 102 that store data associated with the operation of the various applications, apparatuses, and/or functional entities described herein. In some embodiments, data stored at the data store 102 includes approximate location data 108, trusted location data 110, machine learning models 112, training datasets 114, collision predictions 116, traffic data 118, subscriber data 120, and/or the like.

In some embodiments, the approximate location data 108 includes data that enables the collision prediction system 101 to identify and generate approximate locations of environment objects. In some embodiments, the approximate location data 108 includes user inputs, sensor readings, and/or the like that is received from computing entities 103 and based upon which the collision prediction system 101 may approximate a current location of an environment object. In some embodiments, the approximate location data 108 includes additional vehicle position data by which the collision prediction system 101 may approximate the current location of an environment object. For example, the approximate location data 108 may include primary radar data, secondary radar data, vehicle traffic data, and/or the like, associated with an environment object.

In some embodiments, the trusted location data 110 includes data that enables the collision prediction system 10 to identify and obtain trusted locations of vehicles 109. In some embodiments, the trusted location data 110 includes vehicle position data obtained by the collision prediction system 101 from vehicle control systems 105, vehicles 109, primary radar systems 111, secondary radar systems 113, vehicle traffic systems 115, and/or the like. For example, the trusted location data may include radar data, TCAS data, ADS-B data, unmanned vehicle tracking data, simple location data, and/or the like.

In some embodiments, the machine learning models 112 include algorithmic, and/or statistical models that generate a collision prediction 116 based at least in part on approximate location data 108, trusted location data 110, collision boundaries, and/or the like. In some embodiments, the collision prediction system 101 trains the machine learning model 112 to generate collision predictions 116 using one or more training datasets 114. In some embodiments, the training dataset 114 includes historical data associated with collisions and collision predictions. In some embodiments, the training dataset 114 includes historical collision events, near-collision events, and/or the like between vehicles 109 and environment objects. For example, the training dataset 114 may include historical vehicle position data, approximate locations of environment objects, trusted locations of vehicles 109, and/or the like. In some embodiments, the training dataset 114 includes labeled historical data indicative of whether the historical data is associated with a collision event, near-collision event, or safe vehicle traffic. In some embodiments, the collision prediction system 101 performs supervised learning processes using the labeled historical data to train the machine learning model 112.

In some embodiments, the collision predictions 116 include data that measures or indicates a likelihood of a collision between a vehicle and an environment object. In some embodiments, a collision prediction 116 indicates a position and/or time at which a vehicle 109 and an environment object are predicted to collide. Alternatively, or additionally, in some embodiments, a collision prediction includes a position and/or time at which a collision is predicted to have occurred between a vehicle 109 an environment object. In some embodiments, a collision prediction indicates whether an environment object is predicted to move within a predefined collision boundary of a vehicle 109, or vice versa. In some embodiments, the traffic data 118 includes data that indicates potential collisions of one or more vehicles 109 with one or more environment objects. In some embodiments, the traffic data includes geographic coordinates, headings, altitudes, speeds, and identifiers, and/or the like, of one or more vehicles 109 and one or more environment objects within a geozone. In some embodiments, traffic data 118 includes predicted distance ranges between respective vehicles 109, between vehicles 109 and one or more environment objects, and/or the like. In some embodiments, the traffic data 118 includes an indication of whether an environment object is predicted to move within a predefined collision boundary of a vehicle 109.

In some embodiments, the subscriber data 120 includes one or more identifiers including serial numbers, equipment identifiers, and/or the like that uniquely identify a computing entity 103, vehicle control system 105, and/or vehicle 109. In some embodiments, the identifier enables tracking of the vehicle 109 via one or more data sources (e.g., vehicle control stations, radar systems, vehicle traffic systems, and/or the like). In some embodiments, the subscriber data 120 includes configuration data that enables communication with the computing entity 103, vehicle control system 105, or vehicle 109. For example, the subscriber data may include a cellular identifier, radio identifier, satellite identifier, communication protocol and/or the like by which a connection may be established between the collision prediction system 101 and a computing entity 103, vehicle control system 105, or vehicle 109. In some embodiments, the subscriber data 120 includes vehicle information for one or more vehicles 109 including power supply type, power supply capacity, travel range, control range, maximum altitude, payload capacity, maximum speed, and/or the like.

In some embodiments, the subscriber data 120 includes subscriber profiles associated with computing entities 103, vehicle control systems 105, vehicles 109, and/or the like. In some embodiments, the subscriber profile includes stored credentials for uniquely identifying and authenticating communications from the corresponding computing entity 103, vehicle control system 105, or vehicle 109. In some embodiments, to accept or deny communications from a computing entity 103, vehicle control system 105, or vehicle 109, the collision prediction system 101 receives credential data and compares the credential data to subscriber data 120 for matching purposes. In some contexts, the authentication credential data may enable the collision prediction system 101 to improve digital security and trust for vehicle position data, collision predictions, and/or the like. For example, by authenticating sources of vehicle position data, unmanned vehicle tracking data, simple location data, and/or the like, the collision prediction system 101 may prevent unauthorized entities from providing inaccurate and/or malicious data inputs that would otherwise compromise the quality of collision predictions generated by the collision prediction system 101.

In some embodiments, the computing entity 103 provides user inputs, sensor readings, credential data, and/or the like to the collision prediction system 101. In some embodiments, the user inputs, sensor readings, and/or the like indicate or include vehicle position data indicative of an approximate location of an environment object, which may be stored by the collision prediction system 101 as approximate location data 108. Additionally, or alternatively, in some embodiments, the collision prediction system 101 generates an approximate location of an environment object based at least in part on user inputs, sensor readings, and/or the like received from the computing entity 103. In some embodiments, the computing entity 103 provides credential data to the collision prediction system 101 to enable authentication of the computing entity 103 and, based thereon, acceptance of uploads comprising user inputs, sensor readings, and/or the like. In some embodiments, the computing entity 103 provides to the collision prediction system 101 collision boundaries for one or more vehicles 109. Additionally, or alternatively, in some embodiments, the computing entity 103 provides vehicle information to the collision prediction system 101 based upon which one or more collision boundaries, collision predictions, and/or the like may be generated. For example, the computing entity 103 may provide a vehicle identifier, category, class, type, and/or the like to the collision prediction system 101.

In some embodiments, the computing entity 103 includes one or more sensors 107 that generate readings corresponding to a physical environment proximate to the computing entity 103. In some embodiments, the sensors 107 include image capture systems, satellite-based position systems, speed and/or distance estimation sensors, and/or the like. In some embodiments, the computing entity 103 includes one or more algorithms, models, protocols, and/or the like that generate vehicle position data based at least in part on readings from one or more sensors 107. For example, the computing entity 103 may include one or more algorithms, models, protocols, and/or the like, that generate an approximate location of an environment object based at least in part on images of the environment object, geographic coordinates from a satellite-based position system, and/or the like.

In some embodiments, the computing entity 103 includes include one or more displays 123 on which notifications, graphical user interfaces (GUIs), and other information related to vehicles 109, collision predictions 116, traffic data 118, and/or the like, may be rendered. In some embodiments, a display 123 includes a CRT (cathode ray tube), LCD (liquid crystal display) monitor, LED (light-emitting diode) monitor, and/or the like, for displaying information/ data to an operator of the computing entity 103. In one example, the display 123 may include a GUI include a three-dimensional mapping of a geozone comprising an approximate location of an environment object, and the three-dimensional mapping may include one or more indicia indicative of traffic data 118 and/or a predicted collision within the geozone between a vehicle 109 and the environment object. In some embodiments, the indicia include renderings of respective trajectories of the vehicle 109 and environment object, a rendered position in the geozone at which a collision is predicted to occur, a time interval within which the collision is predicted to occur, and/or the like.

In some embodiments, the GUI includes one or more fields by which a user may provide user input to the computing entity 103. For example, the GUI may include a three-dimensional mapping of a geozone comprising the location of the computing entity. In some contexts, the three-dimensional mapping may include selectable regions that enable a user to input an approximate horizontal and vertical position of an environment object within the geozone. In some embodiments, the GUI includes selectable fields that, upon selection, cause the computing entity 103 to capture sensor readings of an environment using one or more sensors 107. For example, the GUI may include a selectable field for activating an image capture system of the computing entity 103 to enable the computing entity 103 to capture images, videos, and/or the like of an environment object. As another example, the GUI may include a selectable field for initiating one or more sensors 107 and/or sensor-based protocols that generate an approximate location, approximate speed, approximate heading, and/or the like of an environment object.

In some embodiments, the computing entity 103 includes one or more input devices 125 for receiving user inputs. For example, the input device 125 may receive user inputs for providing vehicle position data associated with an environment object. In another example, the input device 125 may receive inputs for credential data, such as a username, password, device identifier, network identifier, and/or the like. In still another example, an input device 125 may receive user inputs for activating one or more sensors 107, such as an image capture system. The input device 125 may include any number of devices that enable human-machine interface (HMI) between a user and the computing entity 103. In some embodiments, the input device 125 include one or more buttons, cursor devices, joysticks, touch screens, including three-dimensional or pressure-based touch screens, camera, finger-print scanners, accelerometer, retinal scanner, gyroscope, magnetometer, or other input devices.

In some embodiments, the computing entity 103 includes an application 127 that carries out various functions and processes associated with approximating a location of an environment object, providing data to the collision prediction system 101, predicting collisions between vehicles and environment objects, rendering traffic data on the display 123, and/or the like. In some embodiments, the application 127 includes any combination of software and/or firmware that generates vehicle position data for approximating a location of an environment object, configures collision boundaries for a vehicle 109, communicates with the collision prediction system 101, renders GUIs, notifications, and traffic data, and/or the like. In some embodiments, the application 127 receives user inputs indicative of an approximate location of an environment object. In some embodiments, the application 127 causes rendering of GUIs on the display 123. For example, the application 127 may cause rendering of a GUI including a three-dimensional mapping of a geozone comprising the approximate location of an environment object and indicia indicative of a collision prediction between the environment object and one or more vehicles 109. As another example, the application 127 may cause rendering of a GUI including input fields for receiving credential data, such as a username, password, identifier, and/or the like by which the collision prediction system 101 may authenticate the computing entity 103.

In some embodiments, the application 127 activates one or more sensors 107 to enable generation of sensor readings and outputting of sensor readings to the collision prediction system 101. For example, the application 127 may activate (or otherwise data from) a satellite-based position system, image capture device, and/or the like, and may cause provision of geographic coordinates, images, and/or the like to the collision prediction system 101. In some embodiments, the application 127 communicates with the collision prediction system 101 to configure a collision boundary for one or more vehicles 109. For example, the application 127 may provide one or more values that define a boundary around the vehicle 109 such that predicted movement of an environment object within the boundary may be flagged as a potential collision.

In some embodiments, the vehicle control system 105 remotely monitors and controls operation of one or more vehicles 109. For example, the vehicle control system may remotely monitor and control an unmanned vehicle. In some embodiments, the vehicle control system 105 includes one or more control stations 122 by which an automated computing entity or human controls the vehicle control system 105 to carry out functions and processes including providing unmanned vehicle tracking data to the collision prediction system 101. In some embodiments, the vehicle control system 105 includes any number of computing device(s) and/or other system(s) embodied in hardware, software, firmware, and/or the like that control, operate, receive and maintain data respective to, and/or monitor one or more vehicles 109. In some embodiments, the vehicle control system 105 is configured to communicate with the collision prediction system 101 via the control station 122. For example, the vehicle control system 105 may monitor an unmanned vehicle, generate unmanned tracking data indicative of a trusted location of the unmanned vehicle, and, via the control station 122, provide the unmanned tracking data and/or trusted location of the unmanned vehicle to the collision prediction system 101.

In some embodiments, the control station 122 includes include one or more displays 129 on which notifications, graphical user interfaces (GUIs), and other information related to vehicles 109, collision predictions 116, traffic data 118, and/or the like, may be rendered. In some embodiments, a display 129 includes a CRT (cathode ray tube), LCD (liquid crystal display) monitor, LED (light-emitting diode) monitor, and/or the like, for displaying information/ data to an operator of the control station 122. In one example, the display 129 may include a GUI that displays a notification indicative of traffic data 118, where the traffic data 118 may indicate one or more collision predictions for a geozone comprising the location of an unmanned vehicle controlled by the vehicle control system 105. As another example, the display 129 may include a three-dimensional mapping of the geozone comprising the unmanned vehicle, and the three-dimensional mapping may include one or more indicia indicative of traffic data 118 and/or a predicted collision within the geozone between a vehicle 109 and an environment object. In some contexts, the indicia may include renderings of respective trajectories of the vehicle 109 and environment object. Additionally, or alternatively, the indicia may include a rendered position in the geozone at which a collision is predicted to occur and/or a time interval within which the collision is predicted to occur.

In some embodiments, the control station 122 includes one or more input devices 131 for receiving user inputs. For example, the input device 131 may receive user inputs for providing vehicle position data associated with an environment object. In another example, the input device 131 may receive inputs for credential data, such as a username, password, device identifier, network identifier, and/or the like. In still another example, an input device 131 may receive user inputs for activating one or more sensors 117 of the vehicle 109, such as a satellite-based positioning system. The input device 131 may include any number of devices that enable human-machine interface (HMI) between a user and the control station 122. In some embodiments, the input device 131 include one or more buttons, cursor devices, joysticks, touch screens, including three-dimensional or pressure-based touch screens, camera, finger-print scanners, accelerometer, retinal scanner, gyroscope, magnetometer, or other input devices. In some embodiments, the input device 131 includes one or more vehicle controls (e.g., joysticks, thumbsticks, yokes, steering wheels, accelerator control, thrust control, brake control, and/or the like) that enable a control station 122 to control movement of a vehicle 109.

In some embodiments, the vehicle 109 provides vehicle position data, simple vehicle location data, unmanned vehicle tracking data, and/or the like, to the vehicle control system 105, secondary radar system 113, and vehicle traffic system 115, any of which may further relay the received vehicle communications to the collision prediction system 101. In some embodiments, the vehicle 109 provides vehicle position data, simple vehicle location data, unmanned vehicle tracking data, credential data, and/or the like, directly to the collision prediction system 101 via one or more networks 150. In some embodiments, the vehicle 109 provides credential data to the collision prediction system 101 to enable one or more processes for authenticating the vehicle 109 based at least in part on a comparison between the credential data and subscriber data 120. For example, the collision prediction system 101 may compare the credential data to the subscriber data 120 to determine whether the vehicle 109 is associated with a subscriber profile, the result of which may cause the collision prediction system 101 to permit or deny the vehicle 109 an ability to upload data to the collision prediction system 101.

In some embodiments, the vehicle 109 includes one or more sensors 117 that generate readings respective to the vehicle 109 or environment surrounding the vehicle 109. In some embodiments, sensors 117 include circuits that receive position signals from satellite-based positionings systems (e.g., global navigation satellite system (GNSS) circuits, and/or the like), accelerometers, ultrasonic sensors and/or or other distance sensors, optical sensors (e.g., cameras, infrared imaging devices, and/or the like), magnetometers, altimeters, speedometers, barometers, current sensors, tilt sensors, inertial measurement units, anemometers, and/or the like. In some embodiments, the vehicle 109 generates vehicle position data, simple vehicle location data, unmanned vehicle tracking data, and/or the like, based at least in part on readings from one or more sensors 117. For example, the vehicle 109 may generate vehicle position data indicative of a trusted location of the vehicle 109 based at least in part on readings from a GPS receiver circuit, inertial measurement unit, and/or the like.

In some embodiments, the vehicle 109 includes one or more transponder-based systems that generate vehicle position data and provide the vehicle position data to the collision prediction system, secondary radar system, vehicle control system 105, vehicle traffic system 115, and/or the like. For example, the vehicle 109 may include a traffic collision avoidance system (TCAS) 119, an automatic dependent surveillance-broadcast (ADS-B) system 121, and/or the like, that generates vehicle position data and provisions the vehicle data to the collision prediction system 101. In some embodiments, the TCAS 119, ADS-B system 121, and/or the like generates vehicle position data associated with the vehicle 109 within which the system is disposed and of all other vehicles visible or detectable to the system. In some contexts, the vehicle position data generated by the TCAS 119 or ADS-B system 121 may include identifiers, geographic coordinates, altitudes, speeds, bearings, and/or the like, of all TCAS- and/or ADS-B equipped vehicles within communication range of the vehicle 109. In some contexts, vehicles 109, such as small aircraft, unmanned vehicles, and/or the like, may include a universal access transceiver (UAT) that supports ADS-B, traffic information service-broadcast (TIS-B), and/or the like.

In some embodiments, the TCAS 119 monitors a physical environment around the vehicle 109 for other TCAS-equipped vehicles, generates vehicle position data based on the monitoring of the physical environment, and broadcasts the vehicle position data to one or more external systems via one or more networks 150. In some embodiments, the TCAS 119 generates a trusted location of a vehicle 109 based at least in part on the vehicle position data. For example, the TCAS 119 may generate vehicle position data indicative of an altitude, bearing, speed, and/or geographic location of an aircraft within which the TCAS 119 is disposed. In some embodiments, the TCAS 119 generates vehicle position data indicative of predicted positions of transponder-equipped vehicles. In some embodiments, the TCAS 119 generates respective ranges and courses of travel for nearby TCAS-equipped vehicles based at least in part on data associated with or obtained from interrogation of the other TCASs 119 (e.g., including interrogation-response round trip time, vehicle altitudes, vehicle bearings, and/or the like). In some embodiments, the TCAS 119 may generate a three-dimensional mapping of vehicle locations based at least in part on the ranges, vehicle altitudes, and vehicle bearings.

In some embodiments, the ADS-B system 121 generates vehicle position data indicative of the location of the vehicle 109 and periodically broadcasts the vehicle position data via one or more networks 150 to enable tracking of the vehicle 109 by external systems (e.g., the collision prediction system 101, vehicle traffic system 115, secondary radar system 113, other vehicles 109, and/or the like). In some embodiments, the ADS-B system 121 generates vehicle position data based on one or more sensors 117 of the vehicle 109, such as an inertial measurement unit or a circuit that receives signal from one or more satellite-based positioning systems. In some embodiments, the ADS-B system 121 periodically transmits vehicle position data via a transponder that enables a data link between vehicle and a collision prediction system, vehicle traffic control system, other vehicles, and/or the like. In some embodiments, the ADS-B system 121 receives vehicle position data from other transponder-equipped vehicles. For example, the ADS-B system 121 receives vehicle identifiers, locations, speeds, bearings, and/or the like from all transponder-equipped vehicles within range of the system.

In some embodiments, the primary radar system 111 emits radiofrequency (RF) energy and detects reflections of RF energy from vehicles 109, environment objects, and/or the like. In some embodiments, the primary radar system 111 generates primary radar data based at least in part on the reflected RF energy. In some embodiments, the primary radar system 111 generates a trusted location of a vehicle 109 based at least in part on the primary radar data. Alternatively, in some embodiments, the primary radar system 111 provides the primary radar data to the collision prediction system 101 or a vehicle traffic system 115 that generates the trusted location of the vehicle 109 based thereon. For example, the primary radar system 111 may provide primary radar data to a vehicle traffic system 115, which may generate a trusted location of a vehicle 109 based at least in part on the primary radar data and provide the trusted location to the collision prediction system 101.

In some embodiments, the secondary radar system 113 emits RF energy at an object and receives signal emitted from the object, where the RF energy emitted from the secondary radar system causes the object to emit the signal. For example, the secondary radar system 113 may emit RF energy pulses to interrogate a transponder of a vehicle 109 and, thereby, cause the vehicle 109 to transmit a signal to the secondary radar system 113 via the transponder. In some embodiments, the signal transmitted from the vehicle 109 encodes one or more vehicle identifiers and vehicle position data associated with the vehicle 109. In some embodiments, the secondary radar system 113 generates vehicle position data based at least in part on the signal from the vehicle 109. In some embodiments, the secondary radar system 113 generates a trusted location of one or more objects based at least in part on the secondary radar data. Alternatively, in some embodiments, the secondary radar system 113 provides the secondary radar data to the collision prediction system 101 or a vehicle traffic system 115 that generates the trusted location of the vehicle 109 based thereon. For example, the secondary radar system 113 may provide secondary radar data to a vehicle traffic system 115, which may generate a trusted location of a vehicle 109 based at least in part on the secondary radar data and provide the trusted location to the collision prediction system 101.

In some embodiments, the vehicle traffic system 115 includes any number of computing device(s) and/or other system(s) embodied in hardware, software, firmware, and/or the like that monitor vehicle traffic within a geozone. For example, the vehicle traffic system 115 may embody an air traffic controller (ATC) that monitors movement of aircraft within a region of airspace. In some embodiments, the vehicle traffic system 115 includes one or more primary radar systems 111 and/or secondary radar systems 113 that generate primary radar data, secondary radar data, and/or the like, that indicate (or from which may be generated) a trusted location of one or more vehicles 109. In some embodiments, the vehicle traffic system 115 provides primary radar data, secondary radar data, or other data related to a location or position of a vehicle 109 to the collision prediction system 101. In some embodiments, the vehicle traffic system 115 receives, from the collision prediction system, traffic data indicative of one or more collision predictions. For example, the vehicle traffic system 115 may receive a notification indicative of traffic data for a geozone within which the vehicle traffic system 115 is disposed. In some embodiments, the vehicle traffic system 115 relays notifications to one or more vehicles 109, vehicle control systems 105, computing entities 103, and/or the like. For example, the vehicle traffic system 115 may receive from the collision prediction system 101 a notification comprising traffic data. In some contexts, the vehicle traffic system 115 may broadcast the notification to vehicles 109 that are located within a geozone comprising the vehicle traffic system 115. In some embodiments, the vehicle traffic system 115 generates or vehicle identifiers for vehicles 109 that are located within a geozone comprising the vehicle traffic system. In some embodiments, the vehicle traffic system 115 provides the vehicle identifiers to the collision prediction system 101 and/or stores the vehicle identifiers in a digital storage environment accessible to the collision prediction system 101.

In some embodiments, the collision prediction system 101, computing entity 103, vehicle control system 105, vehicle 109, primary radar system 111, secondary radar system 113, and vehicle traffic system 115 are communicable over one or more communications network(s), for example the communications network(s) 150. It should be appreciated that the communications network 150 in some embodiments is embodied in any of a myriad of network configurations. In some embodiments, the communications network 150 embodies a public network (e.g., the Internet). In some embodiments, the communications network 150 embodies a private network (e.g., an internal, localized, and/or closed-off network between particular devices). In some other embodiments, the communications network 150 embodies a hybrid network (e.g., a network enabling internal communications between particular connected devices and external communications with other devices). In some embodiments, the communications network 150 embodies a satellite-based communication network. Additionally, or alternatively, in some embodiments, the communications network 150 embodies a radio-based communication network that enables communication between the vehicle 109 and the collision prediction system 101, secondary radar system 113, vehicle traffic system 115, and/or the like. For example, the vehicle 109 may provision vehicle position data from a TCAS 119 or ADS-B system 121 to the collision prediction system 101, secondary radar system 113, vehicle traffic system, and/or the like via a transponder or other data link, communication gateway, and/or the like. The communications network 150 in some embodiments may include one or more transponders, base station(s), relay(s), router(s), switch(es), cell tower(s), communications cable(s) and/or associated routing station(s), and/or the like. In some embodiments, the communications network 150 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 150. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 150, the various embodiments are not limited to this particular architecture. In other embodiments, one or more computing entities share one or more components, hardware, and/or the like, or otherwise are embodied by a single computing device such that connection(s) between the computing entities are over the communications network 150 are altered and/or rendered unnecessary.

FIG. 2 illustrates a block diagram of an example apparatus 200 that may be specially configured in accordance with at least some example embodiments of the present disclosure. The apparatus 200 may carry out functionality and processes described herein to generate approximate locations, collision predictions, traffic data, and/or the like. In some embodiments, the apparatus 200 includes a processor 201, memory 203, communications circuitry 205, input/output circuitry 207, and collision prediction circuitry 209. In some embodiments, the apparatus 200 is configured, using one or more of the processor 201, memory 203, communications circuitry 205, input/output circuitry 207, and/or collision prediction circuitry 209, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, controlling, modifying, restoring, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., generating approximate locations, trusted locations, collision predictions, traffic data, and/or the like). In some embodiments, the memory 203 is embodied as, or communicates with, a data store 102 as shown in FIG. 1 and described herein. In some embodiments, the memory 203 includes approximate location data 108, trusted location data 110, machine learning models 112, training datasets 114, collision predictions 116, traffic data 118, subscriber data 120, and/or the like, as further architected in FIG. 3 and described herein.

The processor 201 may be embodied in a number of different ways. For example, in some embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with predicting collisions between vehicles and environment objects. In some embodiments, the processor 201 includes hardware, software, firmware, and/or the like, that generate an approximate location of an environment object based at least in part on data received from one or more computing entities 103. For example, the processor 201 may generate an approximate location of an environment object based at least in part on user inputs, sensors readings, and/or the like received from a computing entity 103. In some embodiments, the process 201 includes hardware, software, firmware, and/or the like, that generate a geozone comprising the approximate location of the environment object, where dimensions of the geozone may be based on a predefined value (e.g., 1 mile, 2 miles, 10 miles, or other proximity ranges). As another example, the processor 201 may generate a trusted location of a vehicle 109 based at least in part on data received from vehicle control systems 105, the vehicle 109 (and/or other vehicles), primary radar systems 111, secondary radar systems 113, vehicle traffic systems

115, and/or the like. In some embodiments, the processor 201 includes hardware, software, firmware, and/or the like, that generate traffic data based at least in part on output from the collision prediction circuitry 209. For example, the processor 201 may generate traffic data for a geozone based at least in part on one or more collision predictions generated by the collision prediction circuitry 209 that are associated with environment objects within the geozone.

In some embodiments, the apparatus 200 includes input/output circuitry 207 that provides output to a user (e.g., a user associated with a computing entity 103 or operator of a control station 122) and, in some embodiments, to receive an indication of a user input. For example, in some contexts, the input/output circuitry 207 provides output to and receives input from one or more computing entities 103 or control stations 122. In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, data store 102, and/or the like). In some embodiments, the input/output circuitry 207 includes or utilizes a user-facing application to provide input/output functionality to a display of a computing entity 103, vehicle control system 105, vehicle 109, vehicle traffic system 115, and/or other display associated with a user.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 205 includes, for example, a network interface for enabling communications with a wired or wireless communications network, such as the network 150 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s).

In some embodiments, the communications circuitry 205 enables transmission to and/or receipt of data from data stores 102, computing entities 103, vehicle control systems 105, vehicles 109, primary radar systems 111, secondary radar systems 113, vehicle traffic systems 115, and/or other external computing devices in communication with the apparatus 200. In some embodiments, the communications circuitry 205, in coordination with the processing circuitry 201 and memory 205, authenticate a computing entity 103, vehicle control system 105, vehicle 109, and/or the like to enable or prevent the uploading of data to the collision prediction system 101. For example, the communications circuitry 205 may receive data comprising user inputs and/or sensor readings from a computing entity 103. The communications circuitry 205 may obtain an identifier and/or other credential data from or based at least in part on the data from the computing entity 103. The process 201 may compare the credential data to subscriber data 120 to determine whether the computing entity 103 is associated with a subscriber profile, the result of which may cause the communications circuitry to permit or refuse further communication from the computing entity 103.

The collision prediction circuitry 209 includes hardware, software, firmware, and/or a combination thereof, that generate a collision prediction. For example, in some contexts, the collision prediction circuitry 209 includes hardware, software, firmware, and/or the like, that generate, using one or more machine learning models 112, a collision prediction based at least in part on a trusted location of a vehicle and an approximate location of an environment object. In some embodiments, the collision prediction circuitry 209 includes hardware, software, firmware, and/or the like, that generate a training dataset 114 based at least in part on approximate location data, approximate location data, one or more prediction collisions, traffic data, and/or the like. In some embodiments, the collision prediction circuitry 209 includes hardware, software, firmware, and/or the like, that train a machine learning model 112 using the training dataset 114 to improve accuracy of subsequent collision predictions. In some embodiments, the collision prediction circuitry 209 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, and/or collision prediction circuitry 209 are combinable. Additionally, or alternatively, in some embodiments, one or more of the sets of circuitry perform some or all of the functionality described associated with another component. For example, in some embodiments, two or more of the sets of circuitry 201-209 are combined into a single module embodied in hardware, software, firmware, and/or a combination thereof. Similarly, in some embodiments, one or more of the sets of circuitry, for example the input/output circuitry 207 and/or collision prediction circuitry 209 is/are combined with the processor 201, such that the processor 201 performs one or more of the operations described above with respect to each of these sets of circuitry 207-209.

Example Data Architectures and Workflows of the Disclosure

Having described example systems and apparatuses in accordance with embodiments of the present disclosure, example architectures of data and workflows in accordance with the present disclosure will now be discussed. In some embodiments, the systems and/or apparatuses described herein maintain data environment(s) that enable the workflows in accordance with the data architectures described herein. For example, in some embodiments, the systems and/or apparatuses described herein function in accordance with the data architectures depicted and described herein with respect to FIG. 3 and the workflows depicted and described herein with respect to FIGS. 4-6 are performed or maintained via the apparatus 200.

FIG. 3. illustrates an example data architecture 300 in accordance with at least some example embodiments of the present disclosure. In some embodiments, the approximate location data 108 includes user inputs 301, sensor readings 303, and/or the like, by which an approximate position of an environment object may be obtained. For example, the sensor readings 303 may include one or more images of an environment object. As another example, the user inputs 301 or sensor readings 303 may include approximate geographic coordinates, an approximate altitude, an approximate speed, and/or the like of an environment object. In some embodiments, the user inputs 301 include one or more user inputs provided to a graphical user interface (GUI). In some embodiments, the user input approximates a three-dimensional (3-D) position of an environment object. For example, a GUI may be rendered on a display of the computing entity 103 and include a rendered mapping of an environment proximate to the computing entity 103. The user inputs 301 may indicate an approximate vertical and horizontal position of an environment object on the rendered mapping (e.g., based upon which an approximate position of the environment object may be generated).

In some embodiments, the trusted location data 110 includes radar data 307, TCAS data 309, ADS-B data 312, unmanned vehicle tracking data 315, simple location data 316, and/or the like. In some embodiments, the radar data 307 includes primary radar data, secondary radar, and/or the like. For example, the radar data 307 may include wave transit times, distance measurements, object profile measurements, received signal angles or bearings, radial velocities, geographic coordinates, object altitudes, vehicle identifiers, and other location data generated by a primary radar system 111 or secondary radar system 113. In some embodiments, TCAS data 309 includes vehicle position data, vehicle identifiers, traffic data, and/or the like received from a TCAS 119. In some embodiments, ADS-B data includes vehicle position data, vehicle identifiers, and/or the like received from an ADS-B system 121. In some embodiments, unmanned vehicle tracking data 315 includes data received from a vehicle control system 105. For example, the unmanned vehicle tracking data 315 may include historical locations or a real-time location of an unmanned vehicle, which may be expressed as values of longitude, latitude, altitude, global area reference system (GARS) code, open location code, geohash, and/or the like. As another example, the unmanned vehicle tracking data 315 may include vehicle speed, bearing, heading, intended course of travel, vehicle identifiers, and/or the like, associated with one or more unmanned vehicles. In some embodiments, simple location data 316 includes data generated by a satellite-based positioning system of a vehicle 109 that lacks a TCAS 119, ADS-B system 121, or other transponder-based system for generating and broadcasting vehicle position data. For example, the simple location data 316 may include GPS-based locations of an aerial vehicle that is without a TCAS 119 or ADS-B system 121.

In some embodiments, the subscriber data 120 includes data associated with subscriber profiles 317. In some embodiments, a subscriber profile 317 includes authentication data 318 that may be used by the collision prediction system 101 to authenticate a vehicle 109, computing entity 103, vehicle control system 105. In some embodiments, successful authentication causes the collision prediction system 101 enable the vehicle 109, computing entity 103, vehicle control system, and/or the like to upload data to a cloud computing environment associated with or embodied by the collision prediction system 101. In some embodiments, the authentication data 318 includes device identifiers, vehicle identifiers, vehicle control system identifiers, and/or the like, that uniquely identify a computing entity 103, vehicle 109, or vehicle control system 105. In some embodiments, the authentication data 318 includes credential data including a username, password, cryptographic key, and/or the like by which an identity of a computing entity 103, vehicle 109, or vehicle control system 105 may be verified. In some embodiments, the subscriber profile 317 includes data that enables the collision prediction system 101 to provide notifications to a computing entity 103, vehicle 109, or vehicle control system 105. For example, the subscriber profile 317 includes a network address, radio communication parameters, email address, and/or the like by which a notification may be provisioned to a computing entity 103, vehicle 109, or vehicle control system 105. In some embodiments, the subscriber profile 317 includes data associated with a vehicle 109 including vehicle category, class, type, operating range, speed range, and/or the like.

In some embodiments, the subscriber profile 317 includes one or more collision boundaries 320 for a vehicle 109. For example, the collision boundary may include an objective or relational measure of distance and/or time between a vehicle 109 and an environment object. In some embodiments, the subscriber profile 317 includes multiple collision boundaries 320 that may be selectively applied based on vehicle position data or other vehicle statuses. For example, the subscriber profile 317 may include a plurality of collision boundaries that are associated with different time intervals, vehicle speed ranges, vehicle locations, vehicle missions (e.g., transportation of cargo, transportation of human passengers, and/or the like), courses of travel, and/or the like.

In some embodiments, the data architecture 300 includes associations between the approximate location data 108, trusted location data 110, and/or collision boundary 320 and a collision prediction 116, traffic data 118, and/or subscriber data 120. For example, subsets of approximate location data 108, trusted location data 110, and traffic data 118 may be associated with each other in the data architecture 300 based at least in part on the respective data being associated with the same geozone, data sources, time interval, and/or the like. As another example, the data store 102 may include associations between a collision prediction 116 and approximate location data 108, trusted location data 110, and/or collision boundaries 320 to enable the collision prediction system 101 to retrieve data that was used to generate the collision prediction 116. In some embodiments, the collision prediction system 101 generates training datasets 114 based at least in part on a historical collision prediction 116 and historical data associated with the generation thereof (e.g., approximate location data 108, trusted location data 110, and/or collision boundaries 320).

In some embodiments, the traffic data 118 is associated with one or more subscriber profiles 317. For example, the traffic data 118 may be associated with subscriber profiles 317 for vehicles 109 that are located in the same geozone with which traffic data 118 is associated. In some embodiments, the collision prediction system 101 receives trusted location data 110 for a geozone and obtains identifiers for a plurality of vehicles 109 located in the geozone based at least in part on the trusted location data 110. In some embodiments, the collision prediction system 101 generates a listing of vehicles 109 in the geozone based at least in part on the identifiers. In some embodiments, the collision prediction system 101 compares the listing of vehicles, or identifiers of the vehicles, to subscriber data 120 to identify one or more vehicles 109 in the geozone that are associated with a subscriber profile 317. In some embodiments, the collision prediction system limits the provisioning of traffic data 118 to vehicles 109 located within the geozone that are also associated with a subscriber profile 317.

FIG. 4 illustrates a diagram of an example workflow 400 for predicting collisions in an aerial environment context. In some embodiments, the workflow 400 is performed by the collision prediction system 101 embodied as the apparatus 200 shown in FIG. 2 and described herein. In various embodiments, the apparatus 200 performs the workflow 400 to generate a collision prediction respective to an environment object, generate traffic data based at least in part on the prediction collision, and provide the traffic data to unmanned aerial vehicles (UAVs), aircraft, and/or the like, that are located within a geozone comprising an approximate location of the environment object and are subscribed to receive collision predictions from the collision prediction system 101.

For example, in an aerial environment context, a high density of flying objects in an airspace may increase the probability of mid-air collisions. Additionally, UAVs and small aircraft may be unequipped with transponders and related systems that broadcast a position of the vehicle and receive vehicle position data from other aerial vehicles (e.g., TCAS, ADS-B, and/or the like). Furthermore, aerial vehicles equipped with position broadcasting equipment may be unable to exchange vehicle position data due to incompatibilities between the various equipment. As a result, the risk of collisions between vehicles of varying type and equipment configuration may increase. The apparatus 200 may further perform the workflow 400 to aggregate vehicle position data at a cloud computing environment, generate collision predictions for a geozone, generate traffic data for the geozone based at least in part on the collision predictions, and provide the traffic data to aerial vehicles in the geozone to increase air traffic awareness and reduce the risk of aerial collisions. In doing so, the apparatus 200 may overcome technical challenges associated with predicting collisions and increasing air traffic awareness for type- and configuration-variant aerial vehicles.

In some embodiments, the workflow 400 includes the apparatus 200 receiving trusted location data from a plurality of vehicles and primary and secondary radar systems of a vehicle traffic system (indicium 402). In some embodiments, the apparatus 200 receives trusted location data from a UAV 403A-B, an aircraft 405A-B that lacks a TCAS and an ADS-B, an aircraft 407A-B equipped with a TCAS 119, a primary radar system 111, and a secondary radar system 113 (indicium 402). In some embodiments, the apparatus 200 receives, from the UAV 403A-B (or a control station that controls the UAV 403A-B), unmanned vehicle tracking data (e.g., a monitored position of the UAV 403A-B, current vehicle speed, vehicle bearing, and/or the like. In some embodiments, the apparatus 200 receives, from the aircraft 405A-B, simple vehicle location data including an estimated position of the aircraft 405A-B generated by an onboard sensor that communicates with a satellite-based positioning system (e.g., geographic coordinates generated by a GPS receiver circuit, and/or the like). In some embodiments, the apparatus 200 receives from the TCAS of the aircraft 407A-B vehicle position data indicative of a current location, altitude, airspeed, and bearing of the aircraft 407A-B. Alternatively, or additionally, in some embodiments, the apparatus receives, from the TCAS, vehicle traffic data indicative of aerial vehicles located in airspace proximate to the aircraft 407A-B. In some embodiments, the apparatus 200 receives primary radar data from the primary radar system 111 and/or secondary radar data from the secondary radar system 113.

In some embodiments, the workflow 400 includes the apparatus 200 generating (or otherwise obtaining) trusted locations of the UAV 403A-B, aircraft 405A-B, and aircraft 407A-B based at least in part on the trusted location data (indicium 404). For example, the apparatus 200 generates a trusted location of the UAV 403A-B based at least in part on the unmanned vehicle tracking data, a trusted location of the aircraft 405A-B based at least in part on the simple vehicle location data, and a trusted location of the aircraft 407A-B based at least in part on the vehicle position data from the TCAS. Additionally, or alternatively, the apparatus 200 may generate the trusted locations of any of the UAV 403A-B, aircraft 405A-B, aircraft 407A-B based at least in part on primary radar data or secondary data.

In some embodiments, the workflow 400 includes the apparatus 200 receiving approximate location data from a computing entity 103 and obtaining an approximate location of the environment object 401. In some embodiments, the approximate location data indicates an approximate location of an environment object 401 within airspace proximate to the computing entity 103 (indicium 406). In some contexts, the computing entity 103 may be embodied as a user-controlled device carried by a skywatcher in a ground environment, where the skywatcher is observing an vehicle traffic in an aerial environment comprising the UAV 403A-B, aircraft 405A-B, and aircraft 407A-B. Additionally, or alternatively, a computing entity 103 may be embodied as a device onboard the aircraft 405A-B or aircraft 407A-B, such as a user-controlled device carried by a passenger, pilot, or other flight crew member.

In some embodiments, the computing entity 103 renders on a display a graphical user interface (GUI) for receiving user input indicative of an approximate location of the including a three-dimensional mapping of the physical environment proximate to the computing entity 103. In some embodiments, the GUI receives user input to the three-dimensional mapping that indicates a location of the environment object 401 in the physical environment. In some embodiments, based at least in part on the inputted location of the environment object 401 on the three-dimensional mapping, the computing entity 103 (or apparatus 200) generates an approximate location of the environment object 401 in the airspace proximate to the UAV 403A-B, aircraft 405A-B, and aircraft 407A-B. Alternatively, or additionally, in some embodiments, the computing entity 103 generates approximate location data based at least in part on one or more sensor readings associated with the environment object 401. For example, the computing entity 103 may include an image capture system that records an image, video, and/or the like of the environment object 401, based upon which a speed, bearing, and/or like may be estimated. As another example, the computing entity 103 may include an optical- or radar-based sensor that generates an estimated altitude and/or speed of the environment object 401. In some embodiments, the approximate location data provided to the apparatus 200 indicates an approximate location of the environment object 401. Alternatively, in some embodiments, the apparatus 200 generates the approximate location of the environment object 401 based at least in part on the approximate location. Additionally, in some embodiments, the apparatus 200 generates the approximate location of the environment object 401 further based at least in part on primary radar or secondary radar associated with the airspace comprising the environment object 401.

In some embodiments, the workflow 400 includes the apparatus 200 generating a collision prediction based at least in part on the approximate location of the environment object 401 and the trusted locations of the UAV 403A-B, aircraft 405A-B, and aircraft 407A-B (indicium 408). In some embodiments, the apparatus 200 determines whether the approximate location of the environment object 401 is within a respective collision boundary for the UAV 403A-B, aircraft 405A-B, and aircraft 407A-B. In some embodiments, the apparatus 200 generates respective trajectories for the environment object 401, UAV 403A-B, aircraft 405A-B, and/or aircraft 407A-B based at least in part on the approximate location data or trusted location data. In some embodiments, the apparatus 200 generates a prediction indicative of whether any of the trajectories of the UAV 403A-B, aircraft 405A-B, and aircraft 407A-B will intersect with the trajectory of the environment object 401, or will otherwise result in the environment object 401 being located within a collision boundary for any of the UAV 403A-B, aircraft 405A-B, or aircraft 407A-B. For example, based at least in part on an approximate location and an approximate speed of the environment object 401, the apparatus 200 may generate a level of likelihood that the environment object 401 will move within a collision boundary of the UAV 403A-B, aircraft 405A-B, or aircraft 407A-B. In some embodiments, the apparatus 200 generates the collision prediction using a machine learning model that processes, as input, the approximate location of the environment object 401 and the trusted locations of the UAV 403A-B, aircraft 405A-B, and aircraft 407A-B.

In some embodiments, the workflow 400 includes the apparatus 200 generating traffic data based at least in part on the collision prediction (indicium 410). For example, the traffic data may include the collision prediction and the approximate location of the environment object 401. As another example, the traffic data may indicate a respective collision boundary of the UAV 403A-B, aircraft 405A-B, and aircraft 407A-B and further indicate a predicted trajectory of the environment object 401 within any of the respective collision boundaries. In some embodiments, the workflow 400 includes the apparatus 200 providing the traffic data to a plurality of subscribers within a geozone that comprises the approximate location of the environment object 401 (indicium 412). In some embodiments, the apparatus 200 determines whether the UAV 403A-B, aircraft 405A-B, and aircraft 407A-B are associated with subscriber profiles to determine whether to provide the air traffic data to the corresponding vehicle. In some embodiments, the apparatus 200 identifies additional vehicles and/or vehicle control systems located within the geozone and determines whether any of the additional vehicles and/or control systems are associated with a subscriber profile. In some embodiments, the apparatus 200 provides the traffic data to any vehicle or vehicle control system that is associated with a subscriber profile and located within the geozone comprising the approximate location of the environment object 401. Additionally, or alternatively, in some embodiments, the apparatus 200 provides the trusted location data used in generating the collision prediction to the UAV 403A-B, aircraft 405A-B, and aircraft 407A-B to enable the vehicles to interchange vehicle position data regardless of compatibility of communication equipment of the vehicles. For example, by providing the trusted location data associated with the UAV 403A-B to the aircraft 405A-B and aircraft 407A-B, the apparatus 200 may overcome technical challenges and/or incompatibilities that prevent direct communication between the UAV 403A-B and the other aircraft.

FIG. 5 illustrates a diagram of an example workflow 500 for detecting collisions. In some embodiments, the collision predictions generated by the collision prediction system 101 indicate the occurrence of a collision between one or more vehicles and an environment object (e.g., including other vehicles). The collision prediction system 101, embodied as the apparatus 200, may perform the workflow 500 to detect that a collision has occurred within a geozone and provision a notification of the collision to vehicles, vehicle control systems, vehicle traffics systems, and/or the like that are located within the geozone.

In some embodiments, the apparatus 200 awaits upload of vehicle position data, user inputs, and/or the from one or more vehicles, vehicle traffic systems, computing entities, vehicle control systems, and/or the like (indicium 503). For example, the apparatus 200 may include or embody a cloud computing environment configured to receive data uploads from vehicles, vehicle traffic systems, computing entities, and vehicle control systems that are associated with respective subscriber profiles. In some embodiments, the apparatus 200 prevents unauthorized data uploads to the cloud computing environment by requiring that data sources be associated with an existing subscriber profile. In some embodiments, vehicles, vehicle traffic systems, computing entities, vehicle control systems, and/or the like complete a login process to enable communication with collision prediction system (indicia 506-509). For example, the apparatus 200 may receive credential data including a device identifier, username, password, and/or the like from a computing entity. As another example, the apparatus 200 may receive a vehicle identifier from a vehicle.

In some embodiments, the apparatus 200 authenticates the subscription of a vehicle, vehicle traffic system, computing entity, vehicle control system, and/or the like based on the received credential data (indicium 512). For example, the apparatus 200 may determine whether credential data received from a computing entity is associated with an existing subscriber profile. In some contexts, in response to determining an association between the credential data and an existing subscriber profile, the apparatus 200 may enable the computing entity to upload data to the cloud computing environment (e.g., user inputs, sensor readings, and/or the like that are indicative of an approximate location of vehicles, environment objects, or collisions). As another example, the apparatus 200 may receive a vehicle identifier from a vehicle, determine the vehicle identifier is associated with an existing subscriber profile, and, in response, permit the vehicle to upload vehicle position data, simple location data, air traffic data, and/or the like to the cloud computing environment. Additionally, or alternatively, in some contexts the apparatus 200 may generate a new subscriber profile based at least in part on the credential data, thereby enabling the corresponding vehicle, vehicle control system, vehicle traffic system, or computing entity to upload data to the cloud computing environment.

In some embodiments, the apparatus 200 obtains data indicative of vehicle positions, collisions, and/or the like (indicium 515). In some embodiments, one or more vehicles upload vehicle position data, simple location data, and/or the like to the cloud computing environment (indicium 518). In some embodiments, the vehicle uploads traffic data indicative of a collision between a vehicle and an environment object. For example, the traffic data may indicate a trusted or approximate position of the vehicle that experienced the collision and/or an approximate position of an environment object that collided with the vehicle. In some embodiments, one or more vehicle traffic systems, vehicle control systems, computing entities, and/or the like upload primary radar data, secondary radar data, unmanned vehicle tracking data, user inputs, sensor readings, and/or the like to the computing environment (indicium 521). For example, a skywatcher may observe a collision between an aircraft and an environment object and, via the computing entity, upload one or more images of the collision, an approximate position of the collision, an approximate location of the environment object, and/or the like, to the cloud computing environment. In some contexts, the computing entity receives a user input to a GUI that includes a three-dimensional mapping of a geozone proximate to the computing entity, where the user input indicates an approximate vertical and horizontal position of a collision. The computing entity may generate and upload geographic coordinates for the collision based at least in part on the user input.

In some embodiments, the apparatus 200 detects whether a collision has occurred based at least in part on the data received from one or more vehicles, computing entities, vehicles, vehicle control systems, vehicle traffic systems, and/or the like (indicium 524). In some contexts, in response to a failure to detect a collision, the apparatus 200 may continue to process data uploaded to the computing environment to detect any subsequent collisions. In response to detecting a collision, the apparatus 200 may generate and provision a notification to vehicles and other data sources in the geozone associated with the collision, such as vehicle control systems, vehicle traffic systems, computing entities, and/or the like (indicia 527-533). In some embodiments, the notification indicates a location associated with the collision, identifiers for one or more vehicles associated with the collision, a time interval in which the collision occurred, and/or the like. Additionally, in some embodiments, the apparatus 200 generates a training dataset based at least in part on the collision and/or data associated with detecting the collision. In some embodiments, the apparatus 200 uses the training dataset to train a machine learning model to generate collision predictions.

FIG. 6 illustrates a functional band diagram depicting operations of an example workflow 600 for generating a collision prediction. Specifically, FIG. 6 depicts a functional band diagram of an example workflow 600 for generating a collision prediction based at least in part on an approximate location of an environment object and a trusted location of one or more vehicles 109. In some embodiments, the workflow 600 is embodied by computer program code stored on a non-transitory computer-readable storage medium of a computer program product configured for execution to perform the process as depicted and described. Additionally, or alternatively, in some embodiments, the workflow 600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the workflow 600 includes the apparatus 200 receiving user inputs from a computing entity 103, where the user inputs include or indicate an approximate location of an environment object (indicium 603). Additionally, or alternatively, in some embodiments, the apparatus 200 receives one or more sensor readings from the computing entity 103. For example, the apparatus 200 receives images, videos, distance estimates, speed estimates, and/or the like generated by one or more sensors of the computing entity 103. Additionally, in some embodiments, the apparatus 200 receives credentials from the computing entity 103. For example, the apparatus 200 may receive a device identifier, network identifier, username, password, and/or the like, from the computing entity 103. In some embodiments, the workflow 600 optionally includes the apparatus 200 authenticating the computing entity 103 (indicium 606). For example, the apparatus 200 may authenticate the computing entity 103 based at least in part on a comparison between credentials received from the computing entity 103 and subscriber data 120. In some embodiments, in response to determining a match between the credentials and the subscriber data, the apparatus 200 authenticates the computing entity 103 and accepts the upload of the approximate location data (e.g., user inputs, sensors readings, and/or the like). In some embodiments, in response to a failure to authenticate the computing entity 103, the apparatus 200 rejects the upload of the approximate location data and/or transmits a notification to the computing entity 103 that indicates the authentication failure.

In some embodiments, the workflow 600 includes the apparatus 200 generating an approximate location of an environment object based at least in part on the user inputs, sensor readings, and/or the like received from the computing entity (indicium 609). Additionally, in some embodiments, the apparatus 200 generates the approximate location of the environment object further based at least in part on primary radar data from a primary radar system 111 and/or secondary radar data from a secondary radar system 113.

In some embodiments, the workflow 600 optionally includes the apparatus 200 receiving primary radar data from a primary radar system 111 (indicium 612). In some embodiments, the workflow 600 optionally includes the apparatus 200 receiving secondary radar data from a secondary radar system 113 (indicium 615). In some embodiments, the primary radar data, secondary radar, and/or the like is associated with a geozone comprising the approximate location of the environment object. In some embodiments, the primary radar data, secondary radar data, and/or the like indicates a trusted location of one or more vehicles 109 within a geozone comprising the approximate location of the aerial vehicle. In some embodiments, the workflow 600 optionally includes the apparatus 200 receiving vehicle traffic data from a vehicle traffic system 115 that monitors vehicle traffic in the geozone (indicium 618). In some embodiments, the vehicle traffic data includes vehicle identifiers for all vehicles within the geozone that are equipped to communicate with the vehicle traffic system 115, such as via a TCAS, ADS-B, and/or the like. In some embodiments, the vehicle traffic data includes additional vehicle position data for one or more vehicles within the geozone, such as current locations, speeds, altitudes, bearings, and/or the like. In some embodiments, the workflow 600 optionally includes the apparatus 200 receiving unmanned vehicle tracking data from one or more vehicle control systems 105, which may be located within or beyond the geozone (indicium 621). In some embodiments, the unmanned vehicle tracking data is associated with an unmanned vehicle that is remotely controlled by the vehicle control system 105 and located within the geozone comprising the approximate location of the environment object.

In some embodiments, the workflow 600 optionally includes the apparatus 200 receiving simple location data from one or more vehicles 109 that lack a TCAS 119, ADS-B system 121, and/or the like (indicium 624). In some embodiments, the simple location data includes sensor readings generated by one or more sensors 117 of the vehicle 109 and/or data generated by the vehicle 109 based at least in part on the sensor readings. For example, the vehicle 109 may include a satellite-based position system, such as a GPS receiver circuit, that receives signals from one or more satellites and generates geographic coordinates, altitude, speed, and/or the like for the vehicle 109 based thereon. In some embodiments, the workflow 600 optionally includes the apparatus 200 receiving vehicle position data from a TCAS 119 of one or more vehicles 109 (indicium 627). In some embodiments, the workflow 600 optionally includes the apparatus 200 receiving vehicle position data from an ADS-B system 121 of one or more vehicles 109 (indicium 630).

In some embodiments, the apparatus 200 authenticates an identity of any of the sources of data associated with indicia 612-630. For example, the apparatus 200 may receive credential data (e.g., system identifier, device identifiers, usernames, passwords, and/or the like) from the vehicle control system 105 or vehicle 109. The apparatus 200 may compare the credential data to subscriber data to determine whether the credential data of the vehicle control system 105 or vehicle 109 is associated with a subscriber profile. In response to determining the vehicle control system 105 or vehicle 109 is associated with a subscriber profile, the apparatus 200 may permit uploading of the corresponding unmanned vehicle tracking data, simple location data, vehicle position data, and/or the like to a storage environment accessible to the apparatus 200, such as one or more data stores 102.

In some embodiments, the workflow 600 optionally includes the apparatus 200 obtaining one or more collision boundaries for one or more vehicles 109, including unmanned vehicles controlled by a vehicle control system 105 (indicium 633). In some embodiments, the apparatus 200 receives an identifier for a vehicle 109 or vehicle control system 105 and generates or retrieves the collision boundary based at least in part on the identifier or other information associated with the identifier. For example, the apparatus 200 may retrieve stored subscription data associated with the identifier, where the subscription data includes a collision boundary for the corresponding vehicle 109. As another example, the apparatus 200 may determine a vehicle category, class, type, and/or the like with which the vehicle 109 is associated and generate or retrieve a collision boundary based thereon.

In some embodiments, the workflow 600 includes the apparatus 200 generating trusted locations for one or more vehicles 109 based at least in part on any of the data associated with indicia 612-630 (indicium 636). In some embodiments, the apparatus 200 generates a trusted location of the vehicle 109 based at least in part on primary radar data, secondary radar data, vehicle traffic data, unmanned vehicle tracking data, simple location data, TCAS data, ADS-B data, and/or the like. For example, the apparatus 200 may generate a trusted location of an unmanned vehicle based at least in part on unmanned vehicle tracking data including a real-time monitored position of the unmanned vehicle. As another example, the apparatus 200 may generate a trusted location of a vehicle 109 that lacks a TCAS 119 or ADS-B system 121 based at least in part on simple location data including geographic coordinates of the vehicle 109 that were generated by an onboard satellite-based positioning system of the vehicle 109 (e.g., GNSS signal receiving circuit, and/or the like). As another example, the apparatus 200 may generate respective trusted locations for a plurality of vehicles 109 based at least in part on secondary radar data associated with the geozone that comprises the approximate location of the environment object.

In some embodiments, the workflow 600 includes the apparatus 200 generating one or more collision predictions based at least in part on the approximate location of the environment object and a trusted location of one or more vehicles 109 (indicium 639). In some embodiments, the workflow 600 further includes the apparatus 200 generating the collision prediction based at least in part on one or more collision boundaries. In some embodiments, the apparatus 200 generate the collision prediction using a machine learning model 112 that was previously trained using one or more training datasets 114 comprising historical vehicle position data, collision events, near-collision events, and/or the like. In some embodiments, inputs to the machine learning model 112 include the approximate location of the environment object and the trusted locations of one or more vehicles 109. Additionally, in some embodiments, the inputs to the machine learning model 112 include vehicle speeds, bearings, dimensions, collision boundaries, and/or the like.

In some embodiments, the workflow 600 includes the apparatus 200 generating traffic data based at least in part on the one or more collision predictions (indicium 642). In some embodiments, the traffic data indicates potential collisions of the one or more vehicles 109 with the environment object. Additionally, or alternatively, in some embodiments, the traffic data indicates potentials collisions between vehicles 109 for which data was previously received at operations indicated by indicia 612-630. In some embodiments, the traffic data includes geographic coordinates, headings, altitudes, speeds, and identifiers, and/or the like, of the environment object and/or vehicles 109. In some embodiments, the traffic data includes an indication of whether the environment object is predicted to move within a collision boundary of a particular vehicle 109. In some embodiments, the traffic data includes a time interval indicative of when the environment object is predicted to move within the collision boundary. In some embodiments, the workflow 600 includes the apparatus 200 providing a notification indicative of the traffic data to the computing entity 103, vehicle traffic system 115, one or more vehicle control systems 105, and one or more vehicles 109 (indicium 645). For example, the apparatus 200 may provide the notification to all vehicles 109 and vehicle control systems 105 located within a geozone comprising the approximate location of the environment object. As another example, the apparatus 200 may provide the notification to all vehicles 109 and vehicle control systems 105 that are associated with a subscriber profile.

Example Processes of the Disclosure

Having described example systems and apparatuses, data architectures, data flows, and graphical representations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates a flowchart depicting operations of an example process 700 example process for generating a collision prediction in accordance with at least some example embodiments of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Additionally, or alternatively, in some embodiments, the process 700 is performed by one or more specially configured computing devices, such as apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the apparatus 200 is in communication with one or more internal or external apparatus(es), system(s), device(s), and/or the like, to perform one or more of the operations as depicted and described. For example, the apparatus 200 may communicate with one or more computing entities 103, vehicle control systems 105, vehicles 109, primary radar systems 111, secondary radar systems 113, vehicle traffic systems 115, and/or the like to perform one or more operations of the process 700.

At operation 703, the apparatus 200 includes means such as the collision prediction circuitry 209, the communications circuitry 205, the input/output circuitry 207, the processor 201, and/or the like, or a combination thereof, that receive user input, sensor readings, and/or the like from one or more computing entities 103. For example, the apparatus 200 may receive a user input to three-dimensional mapping of an environment proximate to the computing entity 103, where the user input indicates an approximate vertical and horizontal position of an environment object within the three-dimensional mapping. As another example, the apparatus 200 may receive an image, video, and/or the like that depicts an environment object. In still another example, the apparatus 200 may receive a measurement of approximate speed, altitude, bearing, and/or the like for an environment object. In some embodiments, at operation 703, the apparatus receives credential data associated with the computing entity 103 that may be used in an authentication operation.

At operation 706, the apparatus 200 optionally includes means such as the collision prediction circuitry 209, the communications circuitry 205, the input/output circuitry 207, the processor 201, and/or the like, or a combination thereof, that authenticate the computing entity 103. For example, the apparatus 200 may authenticate the computing entity based at least in part on credential data obtained from the computing entity 103 at operation 706. In some embodiments, the apparatus 200 determines whether computing entity 103 is associated with a subscriber profile based at least in part on the credential data. For example, the apparatus 200 may retrieve a subscriber profile based at least in part on a received identifier for the computing entity 103. The apparatus 200 may compare a received username and password to stored credential data in the subscriber profile to authenticate the identity of the computing entity 103, where a match between the provided credential data and stored credential data may result in authentication of the computing entity 103. In some embodiments, in response to authenticating the computing entity 103, the apparatus 200 enables the computing entity 103 to upload user inputs, sensor readings, and/or the like to a cloud computing environment accessible to or embodied by the apparatus 200. In some embodiments, in response to a failure to authenticate the computing entity 103 (e.g., based on credential mismatch, absence of a subscriber profile associated with a provided identifier, and/or the like), the apparatus 200 prevents the computing entity 103 from providing data to the cloud computing environment.

At operation 709, the apparatus 200 includes means such as the collision prediction circuitry 209, the communications circuitry 205, the input/output circuitry 207, the processor 201, and/or the like, or a combination thereof, that obtain an approximate location of an environment object based at least in part on the user input, sensor readings, and/or the like of operation 703. For example, the apparatus 200 may obtain an approximate location of an environment object based at least in part on one or more user inputs, sensor readings, and/or the like received from the computing entity. In some embodiments, the apparatus 200 generates the approximate location based at least in part on a user input that indicates an approximate vertical and horizontal position of the environment object within a geozone comprising a trusted location of the computing entity 103. In some embodiments, the apparatus 200 generates the approximate location based at least in part on a user input to a rendered mapping of an environment proximate to the computing entity 103. In some embodiments, the apparatus 200 generates the approximate location based at least in part on a user input including approximate geographic coordinates, heading, bearing, speed, altitude, and/or the like for the environment object. In some embodiments, at operation 709, the apparatus 200 generates a geozone based at least in part on the approximate location of the environment object.

At operation 712, the apparatus 200 optionally includes means such as the collision prediction circuitry 209, the communications circuitry 205, the input/output circuitry 207, the processor 201, and/or the like, or a combination thereof, that receive primary radar data from one or more primary radar systems 111. For example, the apparatus 200 may receive primary radar data associated with a geozone comprising the approximate location of the environment object. In some embodiments, the primary radar data includes vehicle position data associated with one or more vehicles 109, which may be located within the geozone that comprises the approximate location of the environment object.

At operation 715, the apparatus 200 includes means such as the collision prediction circuitry 209, the communications circuitry 205, the input/output circuitry 207, the processor 201, and/or the like, or a combination thereof, that receive secondary radar data from one or more secondary radar systems 113. For example, the apparatus 200 may receive secondary radar data associated with a geozone comprising the approximate location of the environment object. In some embodiments, the secondary radar data includes respective vehicle identifiers and vehicle position data associated with one or more vehicles 109, which may be located within the geozone that comprises the approximate location of the environment object.

At operation 718, the apparatus 200 includes optionally means such as the collision prediction circuitry 209, the communications circuitry 205, the input/output circuitry 207, the processor 201, and/or the like, or a combination thereof, that unmanned vehicle tracking data from one or more vehicle control systems 105. For example, the apparatus 200 may receive unmanned vehicle tracking data from a vehicle control system 105 located within (or in control of a vehicle 109 located within) the geozone that comprises the approximate location of the environment object. In some embodiments, the unmanned vehicle tracking data indicates a trusted location of a vehicle 109. In some embodiments, the apparatus 200 receives credential data associated with the vehicle control system 105. In some embodiments, the apparatus 200 authenticates the vehicle control system 105 based at least in part on the credential data and stored subscriber data. For example, the apparatus 200 may authenticate the vehicle control system 105 in response to determining the received credential data matches or is associated with stored credential data of a subscriber profile.

At operation 721, the apparatus 200 optionally includes means such as the collision prediction circuitry 209, the communications circuitry 205, the input/output circuitry 207, the processor 201, and/or the like, or a combination thereof, that receive vehicle position data from one or more transponder-based systems of a vehicle 109, including a TCAS 119, ADS-B system 121, and/or the like. For example, the apparatus 200 may receive vehicle position data from a TCAS 119 or ADS-B system 121 of a vehicle 109. In some contexts, the vehicle 109 obtains the vehicle position data from the TCAS 119 or ADS-B system 121 and provides the vehicle position data to the apparatus 200 via satellite uplink or other wireless means operative to communicate with a cloud computing environment. In some embodiments, the vehicle 109 is located within the geozone that comprises the approximate location of the environment object.

In some embodiments, at operations 721 or 724, the apparatus 200 receives credential data associated with the vehicle 109. In some embodiments, the apparatus 200 authenticates the vehicle 109 based at least in part on the credential data and stored subscriber data. For example, the apparatus 200 may authenticate the vehicle control system 105 in response to determining the received credential data matches or is associated with stored credential data of a subscriber profile. In some embodiments, the apparatus 200 provides a request for vehicle position data to one or more vehicles 109 located in the geozone, which the apparatus 200 may determine based at least in part on primary radar data, secondary radar data, and/or the like. In some embodiments, the request causes the vehicle to provide vehicle position data to the apparatus 200.

At operation 724, the apparatus 200 optionally includes means such as the collision prediction circuitry 209, the communications circuitry 205, the input/output circuitry 207, the processor 201, and/or the like, or a combination thereof, that receive simple vehicle location data from a vehicle 109. For example, the apparatus 200 may receive simple vehicle location data from the vehicle 109. In some embodiments, the simple vehicle location data is generated by one or more sensors 117 of the vehicle 109. For example, the simple vehicle location data may include a vehicle location generated by the vehicle 109 based at least in part on satellite-based position signals received by a receiver circuit of the vehicle 109 (e.g., GPS signals, GLONASS signals, and/or the like).

At operation 727, the apparatus 200 includes means such as the collision prediction circuitry 209, the communications circuitry 205, the input/output circuitry 207, the processor 201, and/or the like, or a combination thereof, that obtain a trusted location of one or more vehicles 109. For example, the apparatus 200 may obtain a trusted location of one or more vehicles 109. In some embodiments, the apparatus 200 generates a trusted location of a vehicle 109 based at least in part on primary radar data received at operation 712, secondary radar data received at operation 715, unmanned vehicle tracking data received at operation 718, vehicle position data received at operation 721, simple vehicle location data received at operation 724, and/or the like. Additionally, or alternatively, in some embodiments, the apparatus 200 receives a trusted location of a vehicle 109 from a vehicle traffic system 115. In some embodiments, the apparatus 200 generates a trusted location of the vehicle 109 based on data from a plurality of sources. For example, the apparatus 200 may generate a trusted location of a commercial jetliner based at least in part on a combination of primary radar data, secondary radar data, vehicle position data from a TCAS 119 or ADS-B system 121, and/or the like. As another example, the apparatus 200 may generate a trusted location of an unmanned aerial vehicle based at least in part on a combination of unmanned vehicle tracking data, primary radar data, simple vehicle location data, and/or the like. In some embodiments, the apparatus 200 generates the trusted location of the vehicle based at least in part on data that is associated with a most recent time interval. For example, to avoid generating an inaccurate (e.g., "stale") trusted location, the apparatus 200 may exclude data that is associated with a time interval that exceeds a threshold value beyond a current timestamp.

At operation 730, the apparatus 200 optionally includes means such as the collision prediction circuitry 209, the communications circuitry 205, the input/output circuitry 207, the processor 201, and/or the like, or a combination thereof, that obtain a collision boundary for one or more vehicles 109. For example, the apparatus 200 may obtain a collision boundary for a vehicle 109 for which a trusted location was obtained at operation 724. In some embodiments, the apparatus 200 obtains the collision boundary from a subscriber profile associated with the vehicle 109 and/or a vehicle control system 105 or computing entity 103 associated with the vehicle 109. In some embodiments, the apparatus 200 may obtain subscriber data for the vehicle 109, such as a vehicle identifier. In some embodiments, the apparatus 200 generates or receives the collision boundary based at least in part on the subscriber data. For example, the apparatus 200 may generate the collision boundary based at least in part on a vehicle category, class, type, and/or the like, and a relational table that associates values of collision boundary with particular vehicle categories, classes, types, and/or the like. As another example, the apparatus 200 may receive the collision boundary from a data store 102, where the collision boundary may be stored as subscriber data associated with the vehicle 109. As another example, the apparatus 200 may generate a value of the collision boundary using a machine learning model that predicts a safe value of collision boundary for the vehicle 109 based at least in part on an associated vehicle category, class, type, and/or the like, current vehicle traffic density within a geozone comprising the vehicle 109, current speed of the vehicle 109, approximate speed of the environment object, and/or the like.

At operation 733, the apparatus 200 includes means such as the collision prediction circuitry 209, the communications circuitry 205, the input/output circuitry 207, the processor 201, and/or the like, or a combination thereof, that generate a collision prediction based at least in part on the approximate location of the environment object and the trusted locations of one or more vehicles 109. For example, the apparatus 200 may generate a collision prediction based at least in part on the approximate location of the environment object and the trusted locations of one or more vehicles 109. In some embodiments, the apparatus 200 generates the collision prediction using one or more trained machine learning models 112. For example, the apparatus 200 may generate the collision prediction using a machine learning model 112 that has been previously trained to predict a risk of collision, intersection, and/or the like between an environment object and a vehicle 109 based at least in part on inputs comprising an approximate location of the environment object and a trusted location of the vehicle 109. In some embodiments, the apparatus 200 generates the collision prediction further based at least in part on a collision boundary for the one or more vehicles 109. For example, the apparatus 200 may generate the collision prediction using a machine learning model 112 that has been previously trained to predict a likelihood that the environment object is currently, or will be, located within a collision boundary of the vehicle 109 based at least in part on the approximate location of the environment object and a trusted location of the vehicle 109.

At operation 736, the apparatus 200 includes means such as the collision prediction circuitry 209, the communications circuitry 205, the input/output circuitry 207, the processor 201, and/or the like, or a combination thereof, that generate traffic data based at least in part on the collision prediction of operation 733. For example, the apparatus 200 may generate traffic data based at least in part on the collision prediction. In some embodiments, the traffic data includes geographic coordinates, headings, altitudes, speeds, and identifiers, and/or the like, of the environment object, the geozone comprising the approximate location of the environment object, one or more vehicles 109 with which the environment object is predicted to collide, and other vehicles located within the geozone. In some embodiments, the traffic data includes one or more predicted distance ranges between the environment object and one or more vehicles 109 on a time series basis. In some embodiments, the traffic data includes a predicted location and/or time interval at which a collision is predicted to occur.

At operation 739, the apparatus 200 includes means such as the collision prediction circuitry 209, the communications circuitry 205, the input/output circuitry 207, the processor 201, and/or the like, or a combination thereof, that provision a notification indicative of or comprising the traffic data to one or more computing entities 103. For example, the apparatus 200 may provide a notification indicative of the traffic data to the computing entity 103 from which user input, sensor readings, and/or the like were received at operation 703. Additionally, or alternatively, in some embodiments, the apparatus 200 includes means such as the collision prediction circuitry 209, the communications circuitry 205, the input/output circuitry 207, the processor 201, and/or the like, or a combination thereof, that provision a notification indicative of or comprising the traffic data to one or more vehicles 109, one or more vehicle control systems 105, one or more vehicle traffic systems 115, and/or the like. For example, the apparatus 200 may provide a notification indicative of the traffic data to one or more vehicles 109 and/or vehicle control systems 105 from or for which data was received at any of operations 712-724.

In some embodiments, the apparatus 200 provides the notification to computing entities 103, vehicle control systems 105, vehicles 109, vehicle traffic systems 115, and/or the like, that are located within a geozone comprising the environment object. For example, the apparatus 200 may provide a notification indicative of the traffic data to vehicles 109, vehicle control systems 105, and/or vehicle traffic systems 115 located within a geozone comprising the environment object. In some embodiments, the apparatus 200 provides a notification indicative of traffic data to vehicles that lack a transponder, TCAS, ADS-B, and/or the like. In doing so, the apparatus 200 may overcome technical challenges associated with provisioning real-time traffic data to vehicles that are unequipped with transponder-based systems for monitoring a physical environment around the vehicle.

In some embodiments, the apparatus 200 causes the computing entity 103 to render a graphical user interface (GUI) including the notification. In some embodiments, the GUI includes a three-dimensional mapping of the geozone comprising the approximate location of the environment object. In some embodiments, the three-dimensional mapping includes one or more indicative of the collision prediction. For example, the three-dimensional mapping may include a marker indicative of a position within the geozone at which a potential collision may occur. As another example the three-dimensional mapping may include respective trajectories of the environment object and one or more vehicles 109 located within the geozone.

At operation 742, the apparatus 200 optionally includes means such as the collision prediction circuitry 209, the communications circuitry 205, the input/output circuitry 207, the processor 201, and/or the like, or a combination thereof, that generate one or more training datasets based at least in part on the collision prediction of operation 733, the traffic data of operation 736, the data obtained at any of operations 703, 709, 712-730, and/or the like. For example, the apparatus 200 may generate one or more training datasets based at least in part the data received, generated, or otherwise obtained at any of operations 703, 709, 712-736, and/or the like. In some embodiments, a training dataset includes a collision prediction between an environment object and a vehicle 109 and time series data comprising historical approximate locations of the environment object, historical trusted locations of one or more vehicles 109, such that the training dataset may be used to improve the accuracy of prediction collisions by machine learning models. At operation 745, the apparatus 200 optionally includes means such as the collision prediction circuitry 209, the communications circuitry 205, the input/output circuitry 207, the processor 201, and/or the like, or a combination thereof, that train one or more machine learning models 112 using the training dataset of operation 742.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at a cloud computing environment, a user input from a computing entity, wherein the user input is obtained using a graphical user interface (GUI) of the computing entity and comprises an approximate location of an environment object;
generating, at the cloud computing environment and using a machine learning model, at least one collision prediction involving the environment object and at least one vehicle based at least in part on the approximate location of the environment object and a trusted location of the at least one vehicle;
generating traffic data based at least in part on the at least one collision prediction; and
providing a notification indicative of the traffic data to the at least one vehicle and the computing entity.

2. The method of claim 1, wherein:
the computing entity embodies a device onboard an aerial vehicle.

3. The method of claim 1, wherein:
the user input originates from a user-controlled device in an environment external to the at least one vehicle.

4. The method of claim 1, wherein:
the user input further comprises an approximate speed of the environment object; and
the method further comprises generating the at least one collision prediction further based at least in part on the approximate speed of the environment object.

5. The method of claim 1, further comprising:
generating the at least one collision prediction further based at least in part on a predefined collision boundary.

6. The method of claim 5, further comprising:
receiving, at the cloud computing environment, the predefined collision boundary from a computing entity associated with the at least one vehicle.

7. The method of claim 1, wherein:
the trusted location of the at least one vehicle is based at least in part on an upload of primary radar data to the cloud computing environment from a primary radar system; and
the primary radar data is associated with a geozone comprising the approximate location of the environment object and comprises vehicle position data associated with the at least one vehicle.

8. The method of claim 1, wherein:
the trusted location of the at least one vehicle is based at least in part on an upload of secondary radar data to the cloud computing environment from a secondary radar system; and
the secondary radar data is associated with a geozone comprising the approximate location of the environment object and comprises:
an identifier for the at least one vehicle; and
vehicle position data associated with the at least one vehicle.

9. The method of claim 1, wherein:
the at least one vehicle is an unmanned vehicle remotely controlled by a control station located within a predetermined proximity of a geozone comprising the approximate location of the environment object; and
the trusted location of the at least one vehicle is based at least in part on unmanned vehicle tracking data received at the cloud computing environment from the control station.

10. The method of claim 1, wherein:
the trusted location of the at least one vehicle is based at least in part on vehicle position data received at the cloud computing environment from a traffic collision avoidance system (TCAS) of the at least one vehicle.

11. The method of claim 1, wherein:
the at least one vehicle is without a TCAS; and
the trusted location of the at least one vehicle is based at least in part on simple vehicle location data received at the cloud computing environment.

12. The method of claim 11, wherein:
the cloud computing environment receives the simple vehicle location data from a satellite-based position system of the at least one vehicle.

13. The method of claim 1, wherein:
the trusted location of the at least one vehicle is based at least in part on vehicle position data received at the cloud computing environment from an automatic dependent surveillance broadcast (ADS-B) system of the at least one vehicle.

14. The method of claim 1, further comprising:
generating a training dataset based at least in part on the at least one collision prediction; and
retraining the machine learning model using the training dataset.

15. An apparatus comprising at least one processor and at least one non-transitory memory having computer-coded instructions stored thereon that, in execution with at least one processor, cause the apparatus to:
receive, at a cloud computing environment, a user input from a computing entity, wherein the user input is obtained using a graphical user interface (GUI) of the computing entity and comprises an approximate location of an environment object;
generate, at the cloud computing environment and using a machine learning model, at least one collision prediction involving the environment object and at least one vehicle based at least in part on the approximate location of the environment object and a trusted location of the at least one vehicle;
generate traffic data based at least in part on the at least one collision prediction; and
provide a notification indicative of the traffic data to the at least one vehicle and the computing entity.

16. The apparatus of claim 15, wherein:
the computer-coded instructions, in execution with the at least one processor, further cause the apparatus to:
determine a plurality of vehicles located within a geozone comprising the approximate location of the environment object; and
provide a respective notification indicative of the traffic data to the plurality of vehicles.

17. The apparatus of claim 16, wherein:
the computer-coded instructions, in execution with the at least one processor, further cause the apparatus to:
obtain a subscriber list comprising a plurality of vehicle identifiers;

determine a subset of the plurality of vehicles based at least in part on the subscriber list and respective vehicle identifiers for the plurality of vehicles, wherein the providing of the respective notification is limited to the subset of the plurality of vehicles.

18. The apparatus of claim 17, wherein:

the computer-coded instructions, in execution with the at least one processor, further cause the apparatus to:

receive the respective vehicle identifiers for the plurality of vehicles from a vehicle traffic control system.

19. The apparatus of claim 15, wherein:

the computer-coded instructions, in execution with the at least one processor, further cause the apparatus to:

cause rendering of a graphical user interface (GUI) on a display of a computing device associated with the at least one vehicle; and the GUI comprises the notification and a three-dimensional mapping of a geozone comprising at least one indicia indicative of the at least one collision prediction.

20. A computer program product comprising at least one non-transitory computer-readable storage medium having computer program code stored thereon that, in execution with at least one processor, is configured to:

receive, at a cloud computing environment, a user input from a computing entity, wherein the user input is obtained using a graphical user interface (GUI) of the computing entity and comprises an approximate location of an environment object;

generate, at the cloud computing environment and using a machine learning model, at least one collision prediction involving the environment object and at least one vehicle based at least in part on the approximate location of the environment object and a trusted location of the at least one vehicle;

generate traffic data based at least in part on the at least one collision prediction; and provide a notification indicative of the traffic data to the at least one vehicle and the computing entity.

\* \* \* \* \*